US012249311B1

(12) United States Patent
Stockton X et al.

(10) Patent No.: US 12,249,311 B1
(45) Date of Patent: Mar. 11, 2025

(54) MULTIMODAL ACTIVE NOISE CANCELLATION

(71) Applicant: Amazon Technologies, Inc., Seattle, WA (US)

(72) Inventors: Andrew Jackson Stockton X, Boston, MA (US); Ali Abdollahzadeh Milani, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 17/945,563

(22) Filed: Sep. 15, 2022

(51) Int. Cl.
*G10K 11/178* (2006.01)
*G10L 25/78* (2013.01)
*H04R 1/10* (2006.01)

(52) U.S. Cl.
CPC .. *G10K 11/17823* (2018.01); *G10K 11/17825* (2018.01); *G10K 11/17881* (2018.01); *G10L 25/78* (2013.01); *H04R 1/1016* (2013.01); *H04R 1/1083* (2013.01); *G10K 2210/1081* (2013.01); *G10K 2210/3025* (2013.01); *G10K 2210/3026* (2013.01); *G10K 2210/3027* (2013.01); *G10K 2210/3028* (2013.01); *G10K 2210/3044* (2013.01); *H04R 2460/01* (2013.01)

(58) Field of Classification Search
None
See application file for complete search history.

(56) References Cited

U.S. PATENT DOCUMENTS

2013/0108068 A1* 5/2013 Poulsen ................. H04R 5/033 381/74
2014/0086425 A1* 3/2014 Jensen ............ G10K 11/17825 381/71.11
2017/0270906 A1* 9/2017 Kwatra .................... H04R 3/12
2020/0045403 A1* 2/2020 Ganeshkumar ........ H04R 1/406
2022/0210552 A1* 6/2022 Wang ............... G10K 11/17881
2022/0343886 A1* 10/2022 McCutcheon ... G10K 11/17885

FOREIGN PATENT DOCUMENTS

CN 115103258 A * 9/2022
GB 2582372 A * 9/2020 ............ A62B 15/00

* cited by examiner

*Primary Examiner* — Qin Zhu
(74) *Attorney, Agent, or Firm* — Pierce Atwood LLP

(57) ABSTRACT

A system configured to perform adaptive active noise cancellation (ANC) processing. Specifically, the system may adaptively determine a feed-forward ANC filter by maximizing a ratio of A:B, where A corresponds to microphone-ear coherence and B corresponds to microphone-microphone coherence between the feed-forward microphones. By maximizing this ratio, the system may determine weighted gain values used to combine the feed-forward microphone signals. In addition, the system may (i) apply a fixed feed-forward ANC filter profile selected based on a geometry of the device and a generalized ear response, (ii) monitor a secondary path to select from a plurality of feed-forward ANC filter profiles based on an individual user's ear response, or (iii) adaptively update the feed-forward ANC filter based on a feedback microphone signal.

18 Claims, 14 Drawing Sheets

P78944-US01

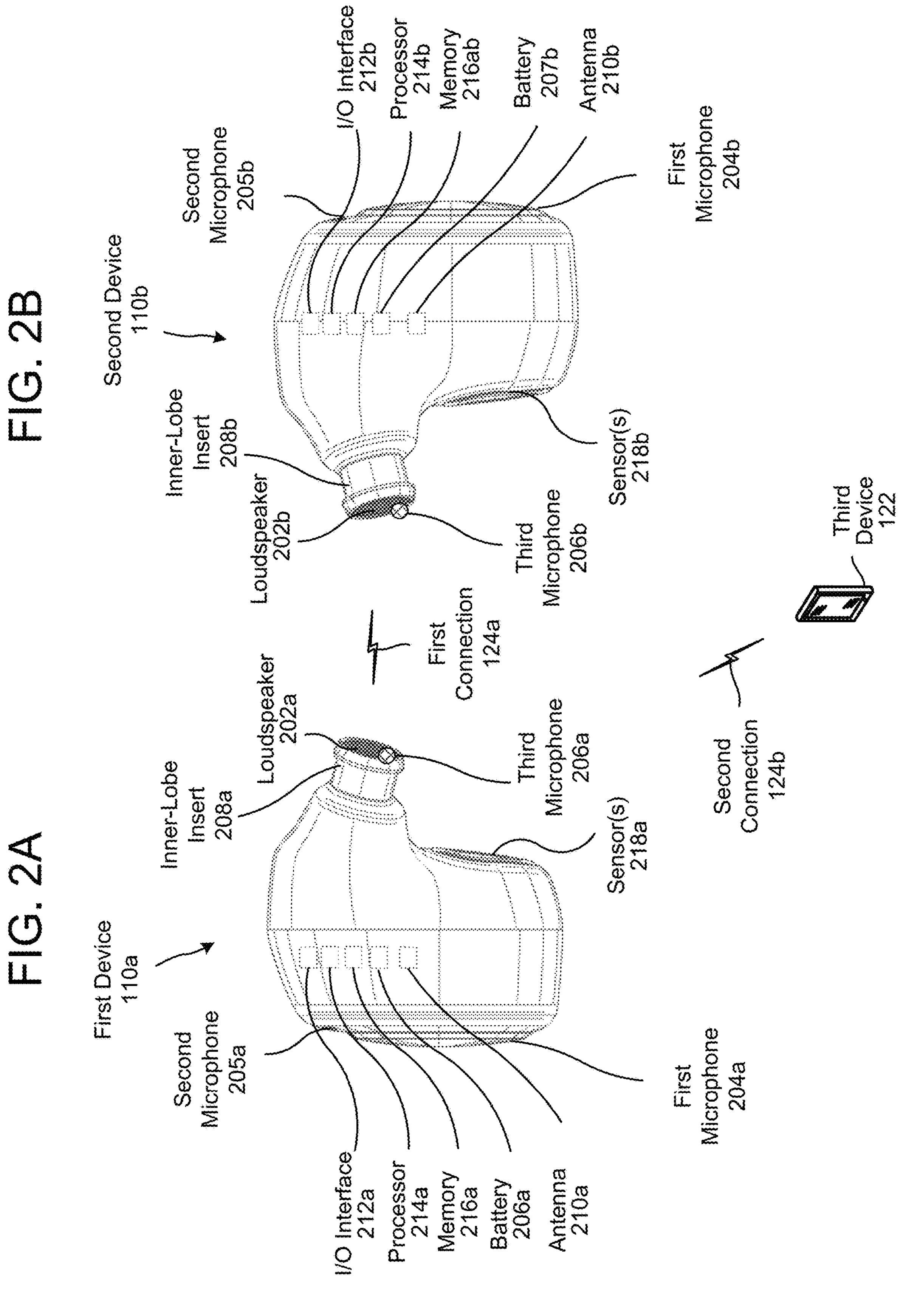
FIG. 2A
FIG. 2B
First Device 110a
Second Device 110b
Inner-Lobe Insert 208a
Loudspeaker 202a
Third Microphone 206a
Sensor(s) 218a
Second Microphone 205a
First Microphone 204a
I/O Interface 212a
Processor 214a
Memory 216a
Battery 206a
Antenna 210a
Second Microphone 205b
I/O Interface 212b
Processor 214b
Memory 216ab
Battery 207b
Antenna 210b
First Microphone 204b
Inner-Lobe Insert 208b
Loudspeaker 202b
Third Microphone 206b
Sensor(s) 218b
First Connection 124a
Second Connection 124b
Third Device 122

FIG. 8

Weighting Equations 800

Ideal ANC Filter 810 → $$ANC_{ideal}^{FF}(j\omega) = \frac{-N_{OI}(j\omega)}{H_{DI}(j\omega)}$$

Coherence Limit 820 → $$Coherence\ Limit = 10 * \log_{10}(1 - C_{OI}(j\omega))$$

Cross-PSD Matrix 830 → $$CPSD(j\omega) = \begin{bmatrix} S_{ee} & S_{m_1 e} & S_{m_2 e} \\ S_{em_1} & S_{m_1 m_1} & S_{m_2 m_1} \\ S_{em_2} & S_{m_1 m_2} & S_{m_2 m_2} \end{bmatrix}$$

Weighting 840 → $$Y = [w_1 * m_1 + w_2 * m_2 + \cdots w_n * m_2]$$

Optimization 850 → $$maximize\ C_{ey} = maximize\ \frac{|S_{ey}|^2}{S_{ee} S_{yy}} = maximize\ \frac{|S_{ey}|}{S_{yy}}$$

Optimization 860 →

$$maximize\ \frac{w^H A w}{w^H B w}$$

$$A = aa^H = [S_{m_1 e} S_{m_2 e}] * [S_{m_1 e} S_{m_2 e}]^H$$

$$B = \begin{bmatrix} S_{m_1 m_1} & S_{m_2 m_1} \\ S_{m_1 m_2} & S_{m_2 m_2} \end{bmatrix}$$

MULTIMODAL ACTIVE NOISE CANCELLATION

BACKGROUND

With the advancement of technology, the use and popularity of electronic devices has increased considerably. Electronic devices may be connected to headphones that generate output audio. Disclosed herein are technical solutions to improve output audio generated by headphones while reducing acoustic feedback.

BRIEF DESCRIPTION OF DRAWINGS

For a more complete understanding of the present disclosure, reference is now made to the following description taken in conjunction with the accompanying drawings.

FIGS. 2A and 2B illustrate wearable audio output devices for performing multimodal active noise cancellation according to embodiments of the present disclosure.

FIG. 8 illustrates examples of equations used to determine a gain weighting according to embodiments of the present disclosure.

DETAILED DESCRIPTION

Figure 1:
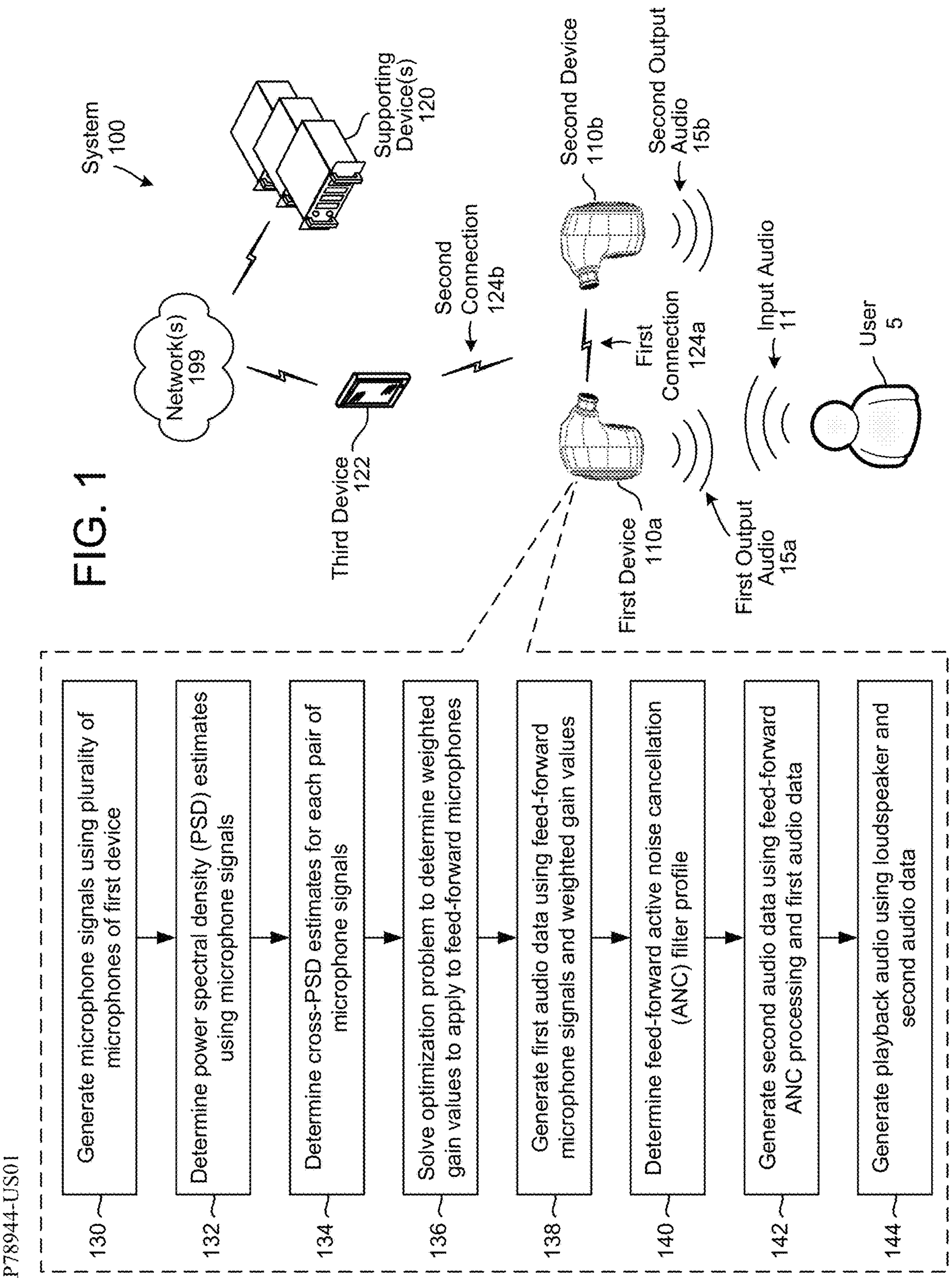
FIG. 1 illustrates wearable audio output devices configured to perform multimodal active noise cancellation according to embodiments of the present disclosure.

Some electronic devices may include an audio-based input/output interface. A user may interact with such a device—which may be, for example, a smartphone, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as a speaker, for outputting audio that in some embodiments responds to and/or prompts for the voice input.

For a variety of reasons, a user may prefer to connect headphones to the device to generate output audio. Headphones may also be used by a user to interact with a variety of other devices. As the term is used herein, "headphones" may refer to any wearable audio input/output device and includes headsets, earphones, earbuds, or any similar device. For added convenience, the user may choose to use wireless headphones, which communicate with the device—and optionally each other—via a wireless connection, such as Bluetooth, Wi-Fi, near-field magnetic induction (NFMI), Long-Term Evolution (LTE), 5G, or any other type of wireless connection.

In certain configurations headphones may deliberately isolate a user's ear (or ears) from an external environment. Such isolation may include, but is not limited to, earbuds which sit at least partially within a user's ear canal, potentially creating a seal between the earbud device and the user's ear which effectively block the inner portions of the ear canal from the external environment. Such isolation may also include providing earcups that envelope a user's ear, blocking the ear off from the external environment. Such isolation results in a significant physical separation from the ear to one or more external noise sources and may provide certain benefits, such as improving an ability to shield the user from external noises and effectively improve the quality of the audio being output by the headphone, earbud, or the like. Such isolation may assist in improving the performance of active noise cancellation (ANC) or other cancellation/noise reduction technology, whose purpose is to reduce the amount of external noise that is detectable by a user.

To further reduce an amount of external noise that is detectable by the user, devices, systems and methods are disclosed that offer a wearable audio output device (e.g., headphones, earphones, and/or the like) configured to perform adaptive ANC processing. Specifically, the wearable audio output device may adaptively determine a feed-forward ANC filter by maximizing a ratio of A:B, where A corresponds to a microphone-ear coherence and B corresponds to a microphone-microphone coherence between feed-forward microphones. By maximizing this ratio, the wearable audio output device may determine weighted gain values used to combine the feed-forward microphone signals. In addition, the wearable audio output device may (i) apply a fixed feed-forward ANC filter profile selected based on a geometry of the wearable audio output device and a generalized ear response, (ii) monitor a secondary path to select from a plurality of feed-forward ANC filter profiles based on an individual user's ear response, or (iii) adaptively update the feed-forward ANC filter based on a feedback microphone signal.

FIG. 1 illustrates wearable audio output devices for performing multimodal active noise cancellation. As used herein, the wearable audio output devices may correspond to headphone components, such as earbuds or an in-ear device. In the present disclosure, for clarity, headphone components that are capable of wireless communication with both a third device and each other are referred to as "wireless earbuds,"

but the term "earbud" does not limit the present disclosure to any particular type of wired or wireless headphones. Unlike headphones or earphones, which remain external to the ear, earbuds may reside at least part inside the ear although the disclosure is not limited thereto. The present disclosure may further differentiate between a "right earbud," meaning a headphone component disposed in or near a right ear of a user, and a "left earbud," meaning a headphone component disposed in or near a left ear of a user. A "primary" earbud communicates with both a "secondary" earbud, using a first wireless connection (such as a Bluetooth connection); the primary earbud further communicates with a third device (such as a smartphone, smart watch, or similar device) using a second connection (such as a Bluetooth connection). The secondary earbud communicates directly only with the primary earbud and does not communicate using a dedicated connection directly with the smartphone; communication therewith may pass through the primary earbud via the first wireless connection.

In some examples, the primary and secondary earbuds may include similar hardware and software; in other instances, the secondary earbud contains only a subset of the hardware/software included in the primary earbud. If the primary and secondary earbuds include similar hardware and software, they may trade the roles of primary and secondary prior to or during operation. In the present disclosure, the primary earbud may be referred to as the "first device," the secondary earbud may be referred to as the "second device," and the smartphone or other device may be referred to as the "third device."

As illustrated in FIG. 1, the system 100 may include a first device 110*a* (e.g., a primary earbud) and a second device 110*b* (e.g., a secondary earbud). The first device 110*a* and the second device 110*b* may communicate using a first wireless connection 124*a*, which may be a Bluetooth, NFMI, or similar connection. In other embodiments, the first device 110*a* and second device 110*b* communicate using a wired connection. The first device 110*a* communicates with a third device 122, such as a smartphone, smart watch, or similar device, using a second connection 124*b*, which may also be a wireless connection such as a Bluetooth Wi-Fi connection or a wired connection.

The present disclosure may refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. In some embodiments, however, a first wireless connection 124*a* between the first device 110*a* and the second device 110*b* is a low-power connection such as BLE; the second wireless connection 124*b* may include a high-bandwidth connection such as EDR in addition to or instead of a BLE connection.

In addition, the first, second, and/or third devices may communicate with one or more supporting device(s) 120, which may be server devices, via a network 199, which may be the Internet, a wide- or local-area network, or any other network. The first device 110*a* may output first output audio 15*a*, and the second device 110*b* may output second output audio 15*b*. The first device 110*a* and second device 110*b* may capture input audio 11 from a user 5, process the input audio 11, and/or send the input audio 11 and/or processed input audio to the third device 122 and/or the supporting device(s) 120, as described in greater detail below.

In the example illustrated in FIG. 1, the first device 110*a* may generate microphone audio data that includes a representation of the input audio 11 generated by the user 5, a representation of the first output audio 15*a* recaptured by the first device 110*a* (e.g., acoustic feedback), and/or a representation of ambient noise (e.g., environmental noise).

In some examples, the first device 110*a* may be configured to perform active noise cancellation (ANC) processing to reduce an amount of ambient noise perceived by the user 5. For example, the device 110 may include one or more feed-forward microphones and/or one or more feedback microphones that enable the first device 110*a* to perform feed-forward ANC processing, feedback ANC processing, and/or hybrid ANC processing. Such ANC (or other cancellation/noise reduction operations) may be manually activated (and deactivated) by a user controlling the headphones (or a connected device) and/or may be automatically activated by the headphones (or a connected device) depending on system configuration. To illustrate an example, the first device 110*a* may perform ANC processing to reduce the user's perception of a noise source in an environment of the first device 110*a*. In some examples, the ANC processing may detect ambient noise generated by the noise source and may cancel at least a portion of the ambient noise (e.g., reduce a volume of the ambient noise). For example, the ANC processing may identify the ambient noise and generate a signal that mirrors the ambient noise with a phase mismatch, which cancels/reduces the ambient noise due to destructive interference.

As illustrated in FIG. 1, the first device 110*a* may generate (130) microphone signals using a plurality of microphones 112 associated with the first device 110*a*. For example, a first microphone 112*a* may be located in an ear canal of the user 5 (e.g., internal microphone) and may be configured to generate a first microphone signal, while a second microphone 112*b* and a third microphone 112*c* may be located external to the ear canal of the user 5 (e.g., external microphones) and may be configured to generate a second microphone signal and a third microphone signal, respectively. As will be described in greater detail below, the first microphone 112*a* may be referred to as a feedback microphone, while the second/third microphones 112*b*/112*c* may be referred to as feed-forward microphones. While the example described above includes two feed-forward microphones and a single feedback microphone, the disclosure is not limited thereto and the number of feed-forward microphones and/or feedback microphones may vary without departing from the disclosure.

The first device 110*a* may determine (132) power spectral density (PSD) estimates (e.g., $S_{m_i}$) using the microphone signals, where i indicates the microphone index. For example, the first device 110*a* may determine first PSD estimates (e.g., $S_{m_1}$) associated with the first microphone signal, second PSD estimates (e.g., $S_{m_2}$) associated with the second microphone signal, and third PSD estimates associated with the third microphone signal (e.g., $S_{m_3}$). To illustrate an example, the first PSD estimates (e.g., first PSD function) may include a plurality of complex values that describe a power present in the first microphone signal as a function of frame index (e.g., audio frame) and/or frequency index (e.g., frequency or subband), as will be described in greater detail below with regard to FIG. 8.

The first device 110*a* may determine (134) cross-PSD estimates for each pair of microphone signals, which will be described in greater detail below with regard to FIG. 8. In some examples, the first device 110*a* may generate a cross-PSD matrix that includes cross-PSD estimates for each pair of microphones. For example, the first device 110*a* may determine a first cross-PSD estimate (e.g., $S_{m_1 m_1}$) for a first microphone pair (e.g., 112*a*/112*a*), a second cross-PSD estimate (e.g., $S_{m_1m_2}$) for a second microphone pair (e.g., 112*a*/112*b*), and a third cross-PSD estimate (e.g., $S_{m_1m_3}$) for a third microphone pair (e.g., 112*a*/112*c*). Similarly, the first device 110*a* may determine a fourth cross-PSD estimate (e.g., $S_{m_2m_1}$) for a fourth microphone pair (e.g., 112*b*/112*a*), a fifth cross-PSD estimate (e.g., $S_{m_2m_2}$) for a fifth microphone pair (e.g., 112*b*/112*b*), and a sixth cross-PSD estimate (e.g., $S_{m_2m_3}$) for a sixth microphone pair (e.g., 112*b*/112*c*). Finally, the first device 110*a* may determine a seventh cross-PSD estimate (e.g., $S_{m_3m_1}$) for a seventh microphone pair (e.g., 112*c*/112*a*), an eighth cross-PSD estimate (e.g., $S_{m_3m_2}$) for an eighth microphone pair (e.g., 112*c*/112*b*), and a ninth cross-PSD estimate (e.g., $S_{m_3m_3}$) for a ninth microphone pair (e.g., 112*c*/112*c*). While the example described above only includes two feed-forward microphones, the cross-PSD matrix can be generated using any number of feed-forward microphones without departing from the disclosure.

Using the cross-PSD estimates, the first device 110*a* may solve (136) an optimization problem to determine weighted gain values for the feed-forward microphones 112*b*/112*c*, as will be described in greater detail below with regard to FIGS. 6-8. For example, the first device 110*a* may maximize a performance of feed-forward ANC processing by determining weighted gain values that maximize a magnitude squared coherence between the feedback microphone 112*a* and a combination of the feed-forward microphones 112*b*/112*c*. In some examples, such as the example described above involving only two feed-forward microphones 112*a*/112*b*, the first device 110*a* may determine first weighted gain values for the second microphone 112*b* and second weighted gain values for the third microphone 112*c*. However, the disclosure is not limited thereto and in other examples the first device 110*a* may determine weighted gain values for additional feed-forward microphone associated with the first device 110*a* without departing from the disclosure.

After determining the weighted gain values, the first device 110*a* may generate (138) first audio data using the feed-forward microphone signals and the weighted gain values. For example, the first device 110*a* may generate the first audio data by combining a first product of the second microphone signal and the first weighted gain values with a second product of the third microphone signal and the second weighted gain values. However, the disclosure is not limited thereto and in some examples the first device 110*a* may generate the first audio data using additional feed-forward microphone signals without departing from the disclosure.

After generating the first audio data (e.g., single-channel feed-forward microphone signal), the first device 110*a* may determine (140) a feed-forward ANC filter profile, as will be described in greater detail below with regard to FIG. 7. In some examples, the first device 110*a* may be configured to apply a fixed feed-forward ANC filter profile without departing from the disclosure. For example, the first device 110*a* may be configured with a predetermined feed-forward ANC filter profile selected based on a geometry of the first device 110*a* and a generalized ear response determined by measuring a plurality of ear responses.

In other examples, the first device 110*a* may select from a plurality of feed-forward ANC filter profiles based on an individual user's ear response. For example, the first device 110*a* may estimate a transfer function between a driver and the first microphone 112*a* (e.g., internal microphone) and can linearly map a magnitude of the transfer function at discrete frequencies to an optimum feed-forward ANC filter profile. Thus, the plurality of feed-forward ANC filter profiles may be pre-computed and stored on the first device 110*a* and the first device 110*a* may select from the plurality of feed-forward ANC filter profiles based on the magnitude values at the discrete frequencies. Additionally or alternatively, the feed-forward ANC filter may be an adaptive filter and the first device 110*a* may adaptively update (e.g., perform adaptation on) the feed-forward ANC filter without departing from the disclosure. For example, the first device 110*a* may monitor a secondary path impulse response and calculate the feed-forward ANC filter adaptively based on the feedback microphone signal.

The first device 110*a* may generate (142) second audio data using the feed-forward ANC processing and the first audio data and may generate (144) playback audio using a loudspeaker and the second audio data. For example, the first device 110*a* may apply the feed-forward ANC filter to the first audio data to generate the second audio data. In addition, the first device 110*a* may combine the second audio data with media content audio data representing media content and/or third audio data generated by a feedback ANC filter to generate playback audio data, which the first device 110*a* may send to the loudspeaker.

As illustrated in FIG. 1, the first device 110*a* may perform steps 130-144 to generate first playback audio for a first ear of the user 5. While not illustrated in FIG. 1, the second device 110*b* may independently perform steps 130-144 to generate second playback audio for a second ear of the user 5. Thus, the first device 110*a* performs first ANC processing using first microphone signals associated with first microphones included in the first device 110*a*, while the second device 110*b* performs second ANC processing using second microphone signals associated with second microphones included in the second device 110*b*.

In some examples, however, the first device 110*a* and the second device 110*b* may communicate and/or coordinate ANC processing without departing from the disclosure. For example, the first device 110*a* may control a first adaptation rate and/or first parameters associated with the first ANC processing based on a second adaptation rate and/or second parameters associated with the second ANC processing, such that an amount of active noise cancellation is similar between the first device 110*a* and the second device 110*b*. Additionally or alternatively, the first device 110*a* and/or the second device 110*b* may send one or more microphone signals, adaptive filter coefficients, noise ANC output signals, and/or the like to the other device without departing from the disclosure. In some examples, the first device 110*a* may determine the weighted gain values and/or determine the feed-forward ANC filter profile using information received from the second device 110*b*. In other examples, the first device 110*a* may compare the weighted gain values, the adaptive filter coefficients, the feed-forward ANC filter profile, and/or the like with similar data generated by the second device 110*b* without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as active noise cancellation (ANC) processing, acoustic feedback cancellation (AFC) processing, acoustic echo cancellation (AEC), adaptive interference cancellation (AIC), noise reduction (NR) processing, and/or the like. For example, the device 110 may convert the time-domain signal to the subband-domain by applying a bandpass filter, a Goertzel filter, and/or other filtering to select a portion of the time-domain signal within a desired frequency range. Additionally or alternatively, the device 110 may convert the time-domain signal to the frequency-domain using a Short-Term Fourier Transform (STFT), a Fast Fourier Transform (FFT), and/or the like without departing from the disclosure.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

The device 110 may include multiple microphones 112 configured to capture sound and pass the resulting audio signal created by the sound to a downstream component for further processing. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. For example, a particular direction may be associated with azimuth angles divided into bins (e.g., 0-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones 112. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, as explained below.

Beamforming systems isolate audio from a particular direction in a multi-directional audio capture system. As the terms are used herein, an azimuth direction refers to a direction in the XY plane with respect to the system, and elevation refers to a direction in the Z plane with respect to the system. One technique for beamforming involves boosting target audio received from a desired azimuth direction and/or elevation while dampening noise audio received from a non-desired azimuth direction and/or non-desired elevation.

FIGS. 2A and 2B illustrate an embodiment of the first device 110*a* and the second device 110*b*, respectively. As shown, the first device 110*a* and the second device 110*b* have similar features; in other embodiments, as noted above, the second device 110*b* (e.g., the secondary device) may have only a subset of the features of the first device 110*a*. As illustrated, the first device 110*a* and second device 110*b* are depicted as wireless earbuds having an inner-lobe insert; as mentioned above, however, the present disclosure is not limited to only wireless earbuds, and any wearable audio input/output system, such as a headset, over-the-ear headphones, or other such systems, is within the scope of the present disclosure.

The devices 110*a*/110*b* may include one or more loudspeaker(s) 114 (e.g., loudspeaker 202*a*/202*b*), one or more external microphone(s) 112 (e.g., first microphones 204*a*/204*b* and second microphones 205*a*/205*b*), and one or more internal microphone(s) 112 (e.g., third microphones 206*a*/206*b*). The loudspeaker 114 may be any type of loudspeaker, such as an electrodynamic speaker, electrostatic speaker, diaphragm speaker, or piezoelectric loudspeaker; the microphones 112 may be any type of microphones, such as piezoelectric or MEMS microphones. Each device 110*a*/110*b* may include one or more microphones 112.

As illustrated in FIGS. 2A-2B, the loudspeaker 202*a*/202*b* and the microphones 204*a*/204*b*/205*a*/205*b*/206*a*/206*b* may be mounted on, disposed on, or otherwise connected to the device 110*a*/110*b*. The devices 110*a*/110*b* further include an inner-lobe insert 208*a*/208*b* that may bring the loudspeaker 202*a*/202*b* and/or the third microphone(s) 206*a*/206*b* closer to the eardrum of the user and/or block some ambient noise.

One or more batteries 207*a*/207*b* may be used to supply power to the devices 110*a*/110*b*. One or more antennas 210*a*/210*b* may be used to transmit and/or receive wireless signals over the first connection 124*a* and/or second connection 124*b*; an I/O interface 212*a*/212*b* contains software and hardware to control the antennas 210*a*/210*b* and transmit signals to and from other components. A processor

Figure 3:
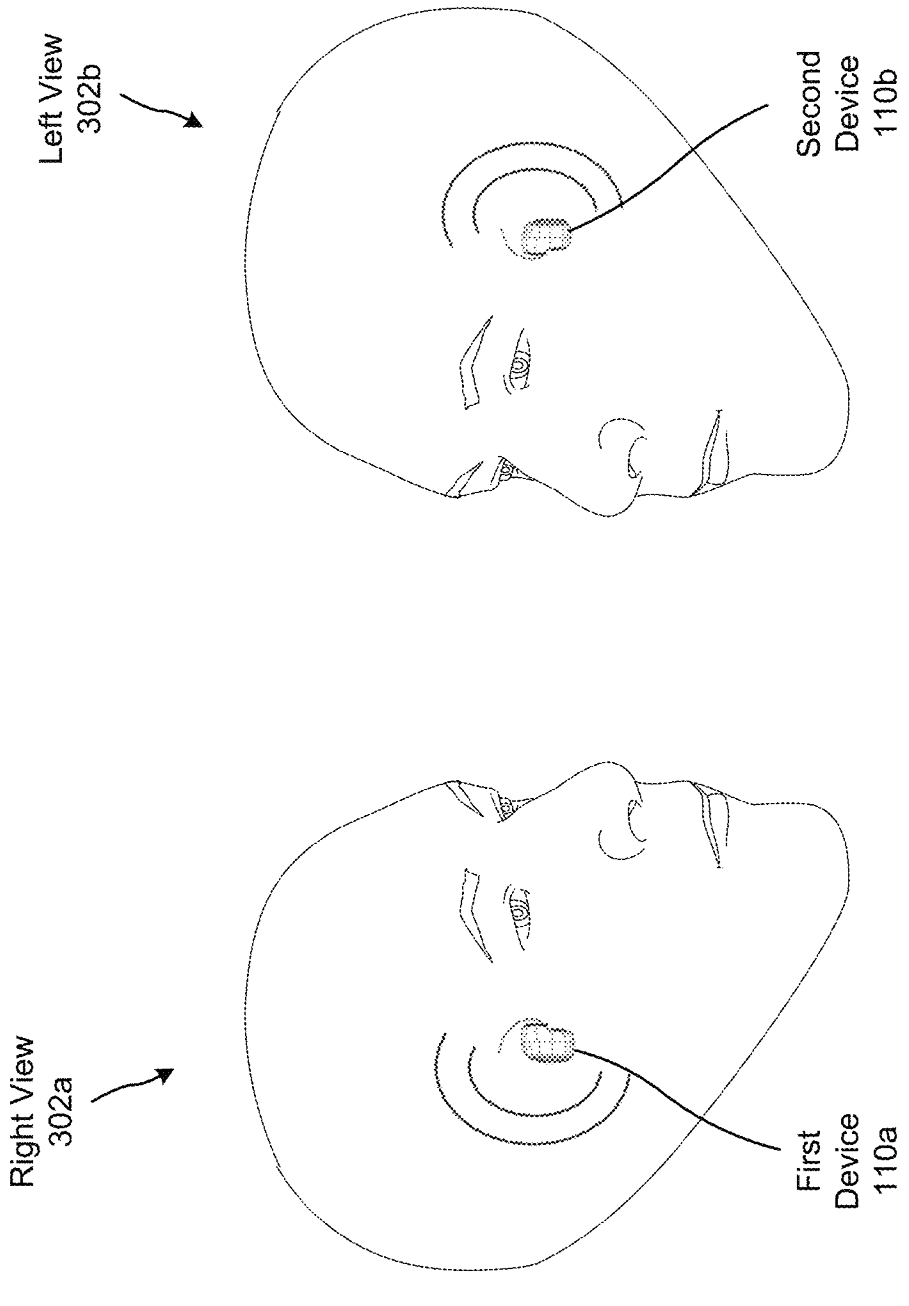
FIG. 3 illustrates various views of use of wearable audio output devices for performing multimodal active noise cancellation according to embodiments of the present disclosure.

214*a*/214*b* may be used to execute instructions in a memory 216*a*/216*b*; the memory 216*a*/216*b* may include volatile memory (e.g., random-access memory) and/or non-volatile memory or storage (e.g., flash memory). One or more sensors 218*a*/218*b*, such as accelerometers, gyroscopes, or any other such sensor may be used to sense physical properties related to the devices 110*a*/110*b*, such as orientation; this orientation may be used to determine whether either or both of the devices 110*a*/110*b* are currently disposed in an ear of the user (i.e., the "in-ear" status of each device). FIG. 3 illustrates a right view 302*a* and a left view 302*b* of a user of the first device 110*a* and the second device 110*b*.

Figure 4A:
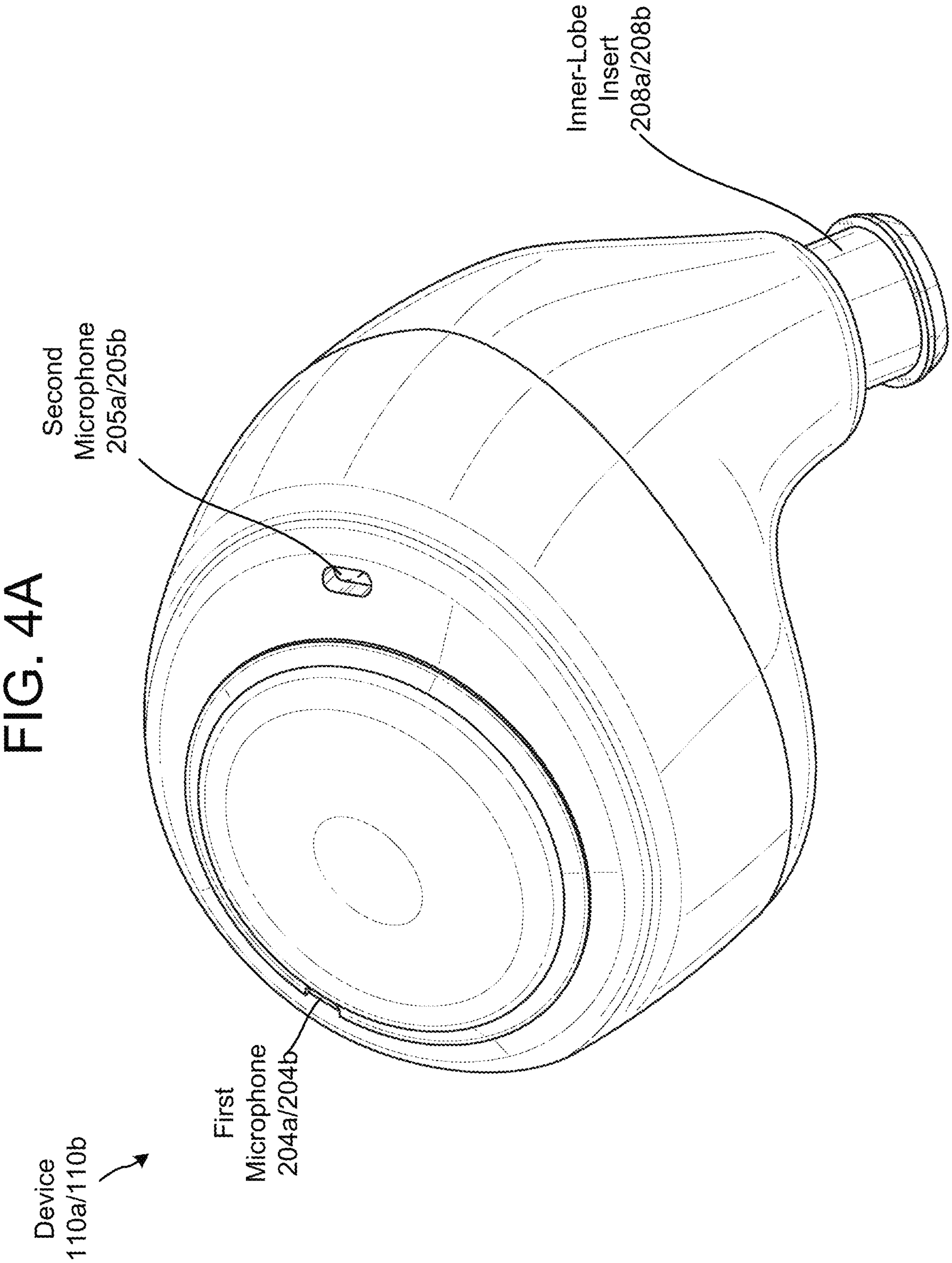
FIGS. 4A, 4B, and 4C illustrate various views of wearable audio output devices for performing multimodal active noise cancellation according to embodiments of the present disclosure.
Figure 4B:
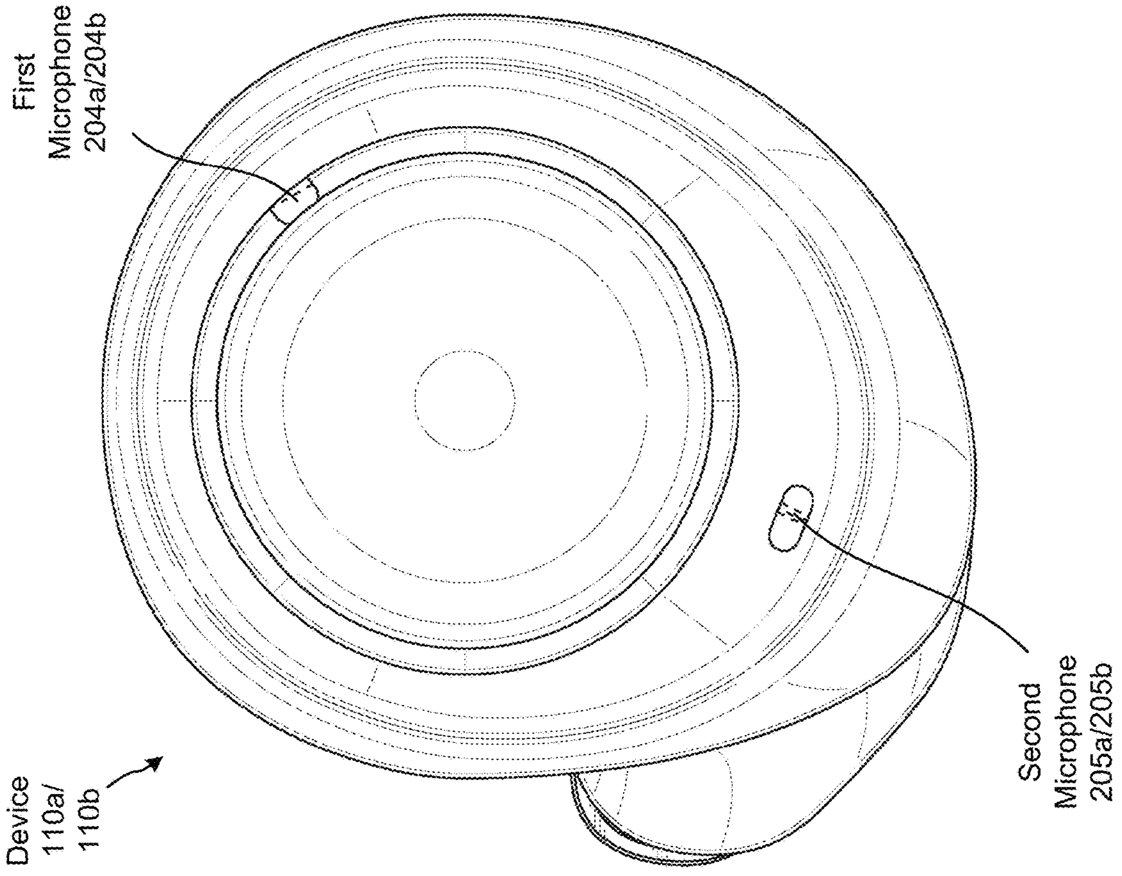
Figure 4C:
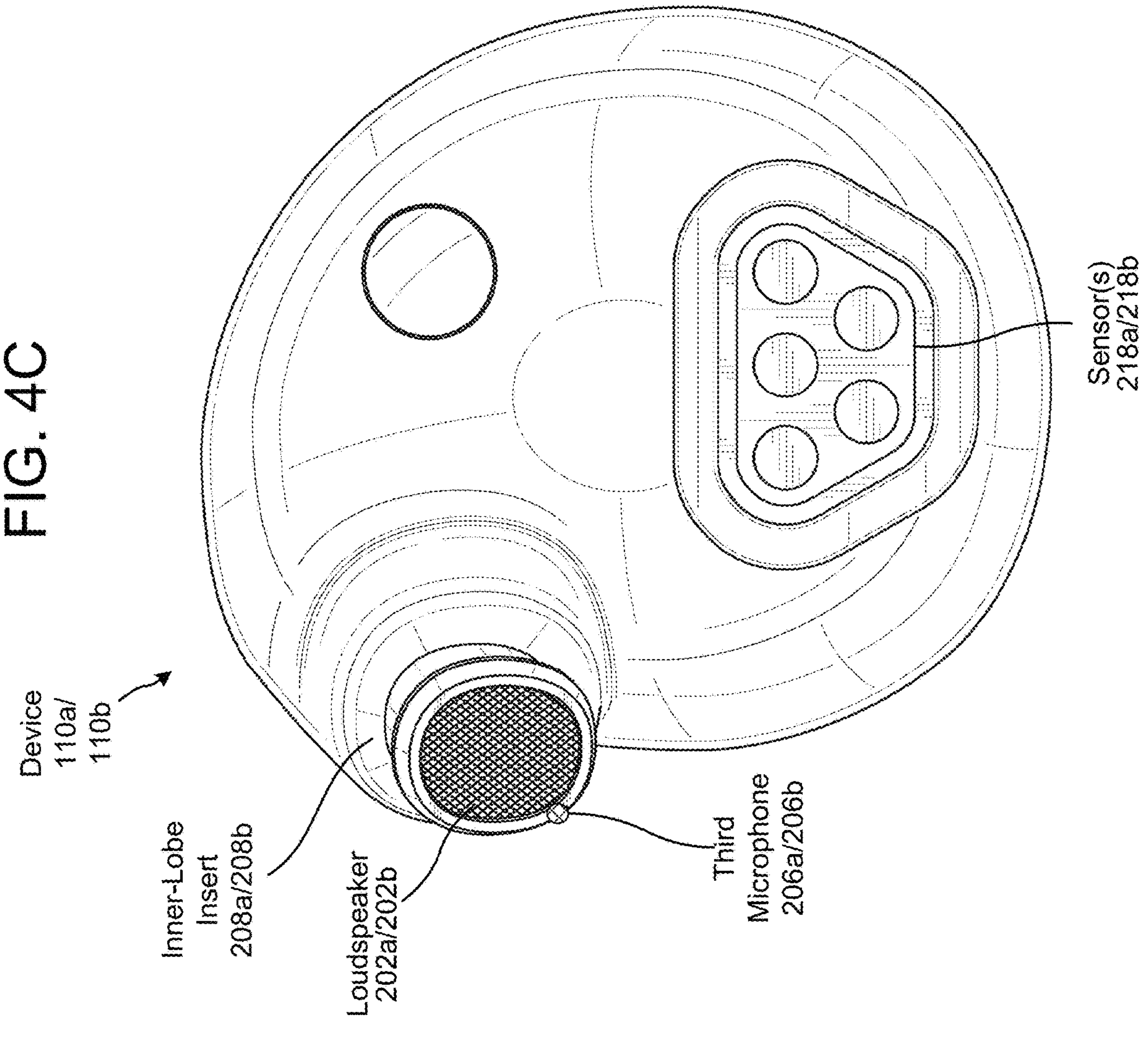

FIGS. 4A, 4B, and 4C illustrate various views of wearable audio output devices for performing multimodal active noise cancellation according to embodiments of the present disclosure. FIG. 4A illustrates one embodiment of placement of the first microphone 204*a*/204*b* and of the second microphone 205*a*/205*b*. The first microphone 204*a*/204*b* is disposed farther from the inner-lobe insert 208*a*/208*b* than is the second microphone 205*a*/205*b*; the first microphone 204*a*/204*b* may thus be disposed closer to the mouth of the user and may therefore receive audio having a higher signal-to-noise ratio than does the second microphone 205*a*/205*b*. FIG. 4B illustrates another one embodiment of the placement of the first microphone 204*a*/204*b* and the second microphone 205*a*/205*b*. FIG. 4C illustrates one embodiment of the placement of the loudspeaker 202*a*/202*b*, third microphone 206*a*/206*b*, inner-lobe insert 208*a*/208*b*, and sensor(s) 218*a*/218*b*. The present disclosure is not limited, however, to only these placements, and other placements of the microphones are within its scope.

Figure 5:
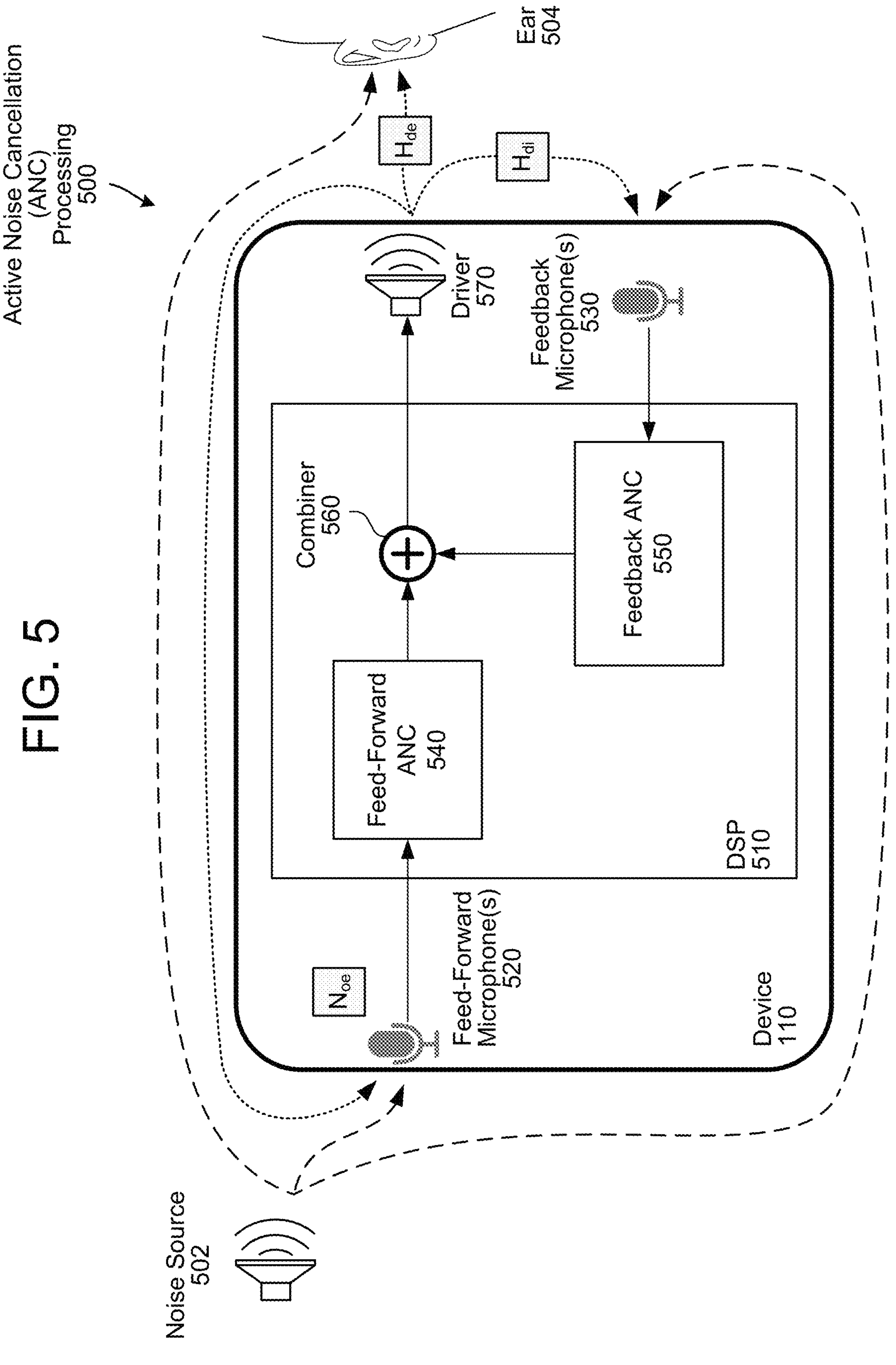
FIG. 5 illustrates an example component diagram for performing active noise cancellation according to embodiments of the present disclosure.

FIG. 5 illustrates an example component diagram for performing active noise cancellation according to embodiments of the present disclosure. As illustrated in FIG. 5, the device 110 may perform active noise cancellation (ANC) processing 500 to reduce the user's perception of a noise source 502 in an environment of the device 110. In some examples, the ANC processing 500 may detect ambient noise generated by the noise source 502 and may cancel at least a portion of the ambient noise (e.g., reduce a volume of the ambient noise). For example, the ANC processing 500 may identify the ambient noise and generate a signal that mirrors the ambient noise with a phase mismatch, which cancels/reduces the ambient noise due to destructive interference. While FIG. 5 only illustrates a single noise source 502, the disclosure is not limited thereto and the device 110 may perform ANC processing 500 to cancel ambient noise generated by two or more noise sources without departing from the disclosure.

As illustrated in FIG. 5, the ANC processing may be performed using feed-forward microphone(s) 520 and/or feedback microphone(s) 530. While FIG. 5 illustrates an example of a single feed-forward microphone 520 and feedback microphone 530, the disclosure is not limited thereto and the device 110 may include multiple feed-forward microphones 520 and/or multiple feedback microphones 530 without departing from the disclosure.

In the example illustrated in FIG. 5, the ambient noise (e.g., ambient sound, environmental noise, etc.) may be captured by the feed-forward microphone(s) 520. Depending on how much the device 110 physically isolates the user's ear 504 from the environment, the ambient noise may also be detected by the ear 504 and/or captured by the feedback microphone(s) 530. For example, feedback microphone(s) 530 included in a device 110 that physically isolates the ear 504 from the environment (e.g., earbuds and/or headphones with a closed design) may detect the ambient noise at lower intensity values (e.g., lower volume level) relative to a feedback microphone(s) included in headphones with an open design.

The device 110 may perform ANC processing 500 using feed-forward ANC processing, feedback ANC processing, hybrid ANC processing, and/or a combination thereof. To illustrate an example of feed-forward ANC processing, the device 110 may capture the ambient noise as first audio data using the feed-forward microphone(s) 520 and may apply a feed-forward filter to the first audio data to estimate the ambient noise signal received by the ear 504. For example, the device 110 may determine a transfer function and/or filters that correspond to a difference between first ambient noise captured by the feed-forward microphone(s) 520 and second ambient noise detected by the ear 504.

In the example illustrated in FIG. 5, the difference between the first ambient noise captured by the feed-forward microphone(s) 520 and the second ambient noise detected by the ear 504 can be modeled by a noise transfer function (e.g., $N_{oe}$) between the outer microphone (e.g., feed-forward microphone(s) 520) and the ear 504 in diffuse noise. This may be referred to as a primary path and the device 110 may approximate the noise transfer function using adaptive filters configured to generate an estimated noise transfer function (e.g., $\hat{N}_{oe}$). Thus, the device 110 may use the first audio data and the estimated noise transfer function (e.g., $\hat{N}_{oe}$) to generate second audio data that estimates the ambient noise signal received by the ear 504. To cancel the second audio data, the device 110 may generate third audio data that mirrors the second audio data but has a phase mismatch that will cancel or reduce the second audio data using destructive interference. In the example illustrated in FIG. 5, the feed-forward ANC processing may be performed by a feed-forward ANC component 540, which generates third audio data that is output to a combiner component 560.

To illustrate an example of feedback ANC processing, the device 110 may capture the ambient noise as fourth audio data using a feedback microphone 530, although the disclosure is not limited thereto and the device 110 may include multiple feedback microphones 530 without departing from the disclosure. As the feedback microphone 530 is located in close proximity to the ear 504, the feedback microphone 530 does not need to estimate the ambient noise signal received by the ear 504 as the fourth audio data corresponds to this ambient noise signal. However, unlike the first audio data generated by the feed-forward microphone(s) 520, the fourth audio data generated by the feedback microphone 530 is not limited to the ambient noise. Instead, due to proximity to the ear 504, the fourth audio data includes the ambient noise and a representation of playback audio generated by the driver 570.

In order to perform feedback ANC processing, the device 110 may remove the playback audio recaptured by the feedback microphone 530 (e.g., by performing echo cancellation and/or the like) and generate fifth audio data that corresponds to the ambient noise. In the example illustrated in FIG. 5, a secondary path between the driver 570 and the inner microphone (e.g., feedback microphone(s) 530) can be modeled by a first transfer function (e.g., $H_{di}$). As part of performing feedback ANC processing, the device 110 may approximate the first transfer function using adaptive filters configured to generate an estimated first transfer function (e.g., $\hat{H}_{di}$). In some examples, the device 110 may use the estimated first transfer function (e.g., $\hat{H}_{di}$) to generate sixth audio data that estimates the ambient noise signal received by the ear 504, although the disclosure is not limited thereto.

To cancel the fifth audio data, the device 110 may generate sixth audio data that mirrors the fifth audio data but has a phase mismatch that will cancel or reduce the fifth audio data using destructive interference. In the example illustrated in FIG. 5, the feedback ANC processing may be performed by a feedback ANC component 550, which generates sixth audio data that is output to the combiner component 560.

As illustrated in FIG. 5, a digital signal processing (DSP) component 510 may include the feed-forward ANC component 540, the feedback ANC component 550, and the combiner component 560. The combiner component 560 may combine the third audio data generated by the feed-forward ANC component 540 and the sixth audio data generated by the feedback ANC component 550 to generate seventh audio data and may send the seventh audio data to the driver 570 to generate playback audio. In the example illustrated in FIG. 5, a path between the driver 570 and the ear 504 can be modeled by a second transfer function (e.g., $H_{de}$). Due to the phase mismatch and/or destructive interference, the playback audio generated by the driver 570 may cancel and/or reduce the ambient noise perceived by the ear 504.

While not illustrated in FIG. 5, in some examples the device 110 may generate the playback audio using media content audio data representing media content, such as music, audiobooks, podcasts, talk radio, and/or the like. In these examples, the device 110 may retrieve and/or receive the media content audio data and the combiner component 560 may generate the seventh audio data using the media content audio data, the third audio data, and/or the sixth audio data without departing from the disclosure. Thus, the playback audio generated by the driver 570 may include a representation of the media content, although the disclosure is not limited thereto. Additionally or alternatively, the feedback ANC 550 may receive the media content audio data and use the media content audio data to generate the fifth audio data without departing from the disclosure.

In the example illustrated in FIG. 5, the device 110 may perform ANC processing 500 using a combination of feed-forward ANC processing and feedback ANC processing. For example, the combiner component 560 may combine the third audio data generated by the feed-forward ANC component 540 and the sixth audio data generated by the feedback ANC component 550. However, the disclosure is not limited thereto, and in some examples the device 110 may perform ANC processing 500 using hybrid ANC processing without departing from the disclosure. For example, instead of separately generating the third audio data and the sixth audio data, during hybrid ANC processing the DSP component 510 may jointly perform feed-forward ANC processing and feedback ANC processing to generate a single output (e.g., output audio data). In some examples, during hybrid ANC processing the DSP component 510 may compare first audio data generated by the feed-forward microphone(s) 520 with second audio data generated by the feedback microphone 530 and/or the media content audio data, although the disclosure is not limited thereto.

Figure 6:
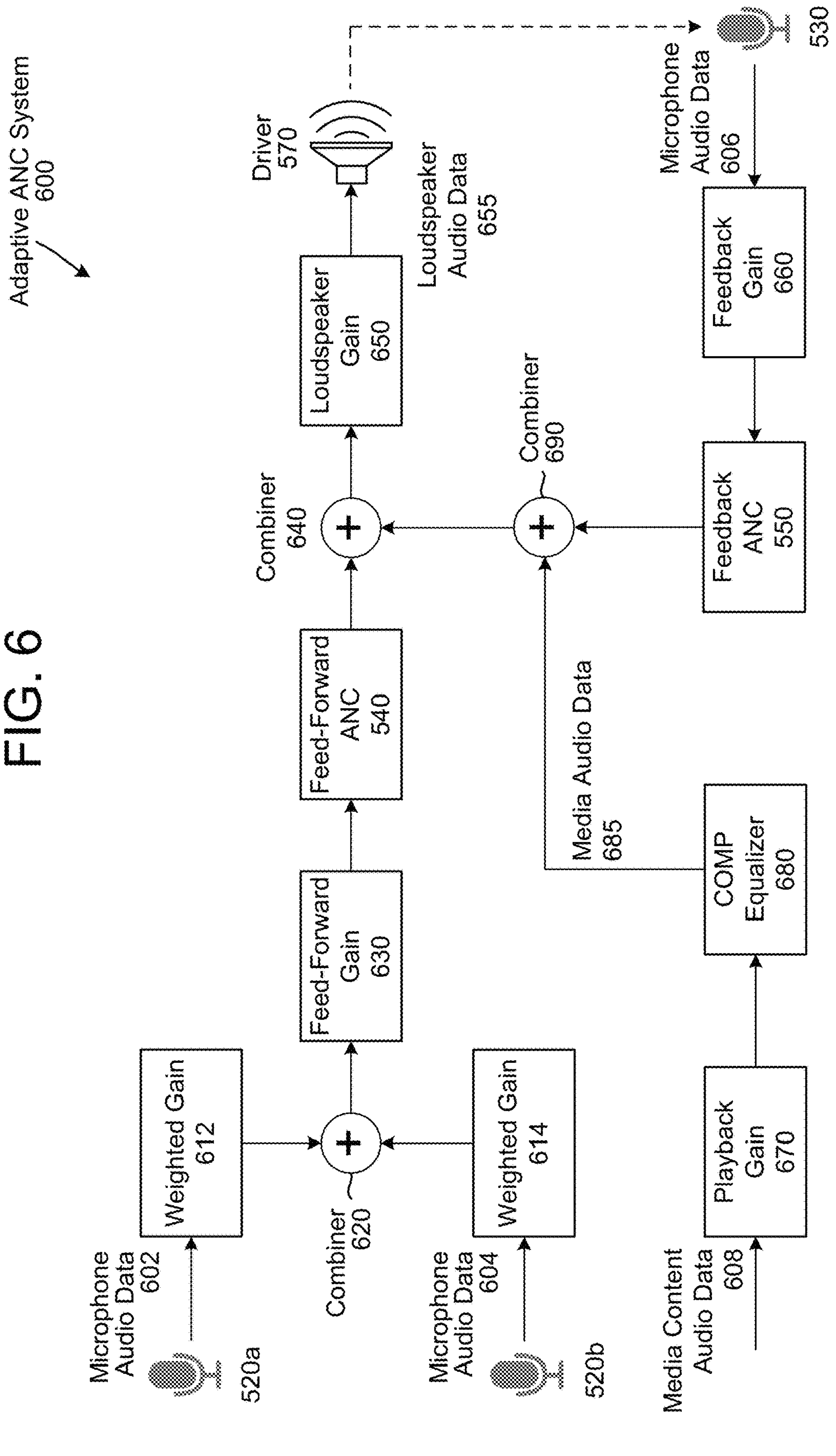
FIG. 6 illustrates an example component diagram for an adaptive active noise cancellation system according to embodiments of the present disclosure.

FIG. 6 illustrates an example component diagram for an adaptive active noise cancellation system according to embodiments of the present disclosure. As illustrated in FIG. 6, an adaptive ANC system 600 may include several components described above with regard to FIG. 5, such as the feed-forward microphone(s) 520, the feed-forward ANC component 540, the feedback microphone 530, the feedback ANC component 550, and the driver 570. Thus, the overall processing of the adaptive ANC system 600 may be similar to the ANC processing 500 without departing from the disclosure.

The adaptive ANC system 600 is not identical to the ANC processing 500, however, as the adaptive ANC system 600 illustrates additional components that increase a complexity and/or enable the adaptive ANC system 600 to perform adaptive ANC processing. For example, the adaptive ANC system 600 includes a fourth audio path associated with media content, as well as a number of gain components that enable the adaptive ANC system 600 to balance relative gain values and/or control an amount of gain applied in each audio path. Additionally or alternatively, the adaptive ANC system 600 includes two feed-forward microphones 730*a*/730*b* and a combiner component 620 configured to generate a combined single-channel feed-forward microphone signal.

As illustrated in FIG. 6, the adaptive ANC system 600 may include a first feed-forward microphone 520*a* configured to generate first microphone audio data 602 and a second feed-forward microphone 520*b* configured to generate second microphone audio data 604. To combine the two feed-forward microphone signals, the adaptive ANC system 600 includes a first weighted gain component 612, a second weighted gain component 614, and a combiner component 620. For example, the first weighted gain component 612 may apply first weighted gain values to the first microphone audio data 602, the second weighted gain component 614 may apply second weighted gain values to the second microphone audio data 604, and the combiner component 620 may combine the two outputs to generate the combined feed-forward microphone signal. The adaptive ANC system 600 may determine the first weighted gain values and the second weighted gain values in order maximize a performance of the feed-forward ANC component 540, which will be described in greater detail below with regard to FIG. 8.

A feed-forward gain component 630 may apply a first gain to the combined feed-forward microphone signal to generate first audio data and output the first audio data to the feed-forward ANC component 540. As described above, a difference between first ambient noise captured by the feed-forward microphones 520*a*/520*b* and second ambient noise detected by the ear 504 can be modeled by a noise transfer function (e.g., $N_{oe}$) between the feed-forward microphones 520*a*/620*b* and the ear 504 in diffuse noise. The feed-forward ANC component 540 may approximate the noise transfer function using adaptive filters configured to generate an estimated noise transfer function (e.g., $\hat{N}_{oe}$). Thus, the feed-forward ANC component 540 may use the first audio data and the estimated noise transfer function (e.g., $\hat{N}_{oe}$) to generate second audio data that estimates the ambient noise signal received by the ear 504. To cancel the second audio data, the device 110 may generate third audio data that mirrors the second audio data but has a phase mismatch that will cancel or reduce the second audio data using destructive interference.

A combiner component 640 may combine the third audio data with an output of a combiner component 690, which will be described below, to generate fourth audio data. The combiner component 640 may output the fourth audio data to a loudspeaker gain component 650, which may be configured to apply a second gain to the fourth audio data to generate loudspeaker audio data 655. The loudspeaker audio data 655 may be sent to the driver 570 and the driver 570 may generate output audio using the loudspeaker audio data 655.

A portion of the output audio may be recaptured by the feedback microphone 530. For example, the feedback microphone 530 may generate third microphone audio data 606 representing the portion of the output audio. The feedback microphone 530 may output the third microphone audio data 606 to a feedback gain component 660 and the feedback gain component 660 may apply a third gain to generate fifth audio data. The feedback gain component 660 may output the fifth audio data to the feedback ANC component 550 and the feedback ANC component 550 may perform feedback ANC filter processing to generate sixth audio data.

As illustrated in FIG. 6, in some examples the adaptive ANC system 600 may receive media content audio data 608 representing media content, such as music, an audiobook, a podcast, and/or the like. When the adaptive ANC system 600 receives the media content audio data 608, a playback gain component 670 may apply a fourth gain to the media content audio data 608 to generate seventh audio data and the seventh audio data may be processed by a playback compensation (COMP) equalizer component 680 to generate media audio data 685. For example, the playback compensation equalizer component 680 may be configured to perform playback compensation equalization to generate the media audio data 685. Finally, the combiner component 690 may combine media audio data 685 with the sixth audio data to generate eighth audio data to send to the combiner component 640. Thus, the loudspeaker audio data 655 may represent the media content along with a noise cancellation signal that may cancel and/or attenuate some of the ambient noise perceived by the user.

Figure 7:
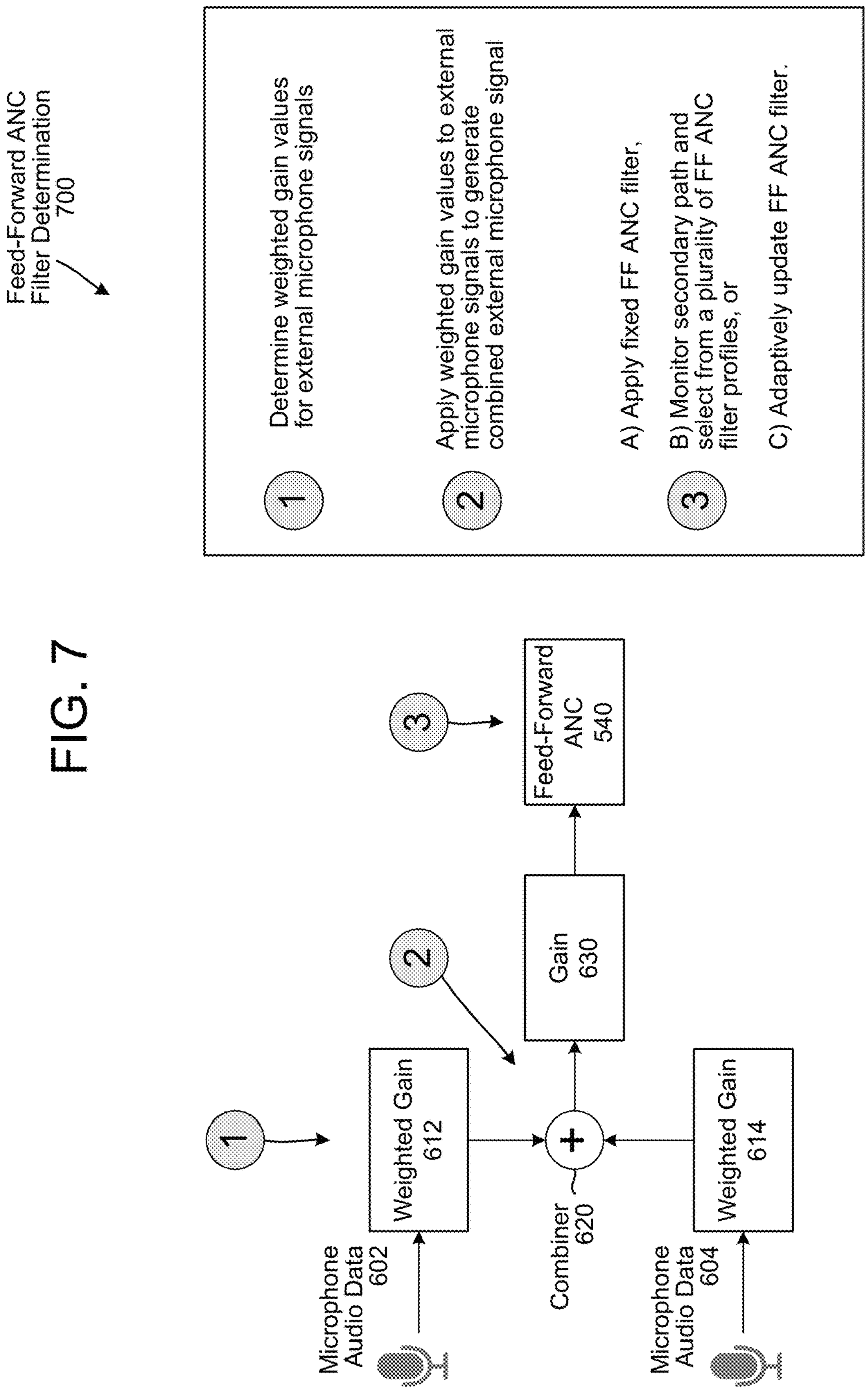
FIG. 7 illustrates an example of determining a feed-forward active noise cancellation filter according to embodiments of the present disclosure.

FIG. 7 illustrates an example of determining a feed-forward active noise cancellation filter according to embodiments of the present disclosure. As illustrated in FIG. 7, the device 110 may perform feed-forward ANC filter determination 700 in three steps. First, the device 110 may determine weighted gain values for the external microphone signals (e.g., step "1"). For example, the device 110 may determine the first weighted gain values and the second weighted gain values, which will be described in greater detail below with regard to FIG. 8. Second, the device 110 may apply the weighted gain values to the external microphone signals (e.g., first microphone audio data 602 and second microphone audio data 604) to generate a combined single-channel feed-forward microphone signal, as described above with regard to FIG. 6.

After generating the combined feed-forward microphone signal, the device 110 may determine the feed-forward ANC filter. In some examples, the device 110 may be configured to apply a fixed feed-forward ANC filter without departing from the disclosure. For example, the device 110 may be configured with a predetermined feed-forward ANC filter selected based on a geometry of the device 110 and a generalized ear response determined by measuring a plurality of ear responses.

In other examples, the device 110 may monitor the secondary path and select from a plurality of feed-forward ANC filter profiles based on an individual user's ear response. For example, when the device 110 is generating output audio for the user, the device 110 may estimate a transfer function between the driver 570 and the ear 504 (or feedback microphone 530) and can linearly map a magnitude of the transfer function at discrete frequencies to an optimum feed-forward ANC filter profile. Thus, the plurality of feed-forward ANC filter profiles may be pre-computed and stored on the device 110 and the device 110 may select from the plurality of feed-forward ANC filter profiles based on the magnitude values at the discrete frequencies. Additionally or alternatively, the feed-forward ANC filter may be an adaptive filter and the device 110 may adaptively update the feed-forward ANC filter without departing from the disclosure. For example, the device 110 may monitor a secondary path impulse response and calculate the feed-forward ANC filter adaptively based on the feedback microphone signal (e.g., third microphone audio data 606).

As used herein, an adaptive filter is digital filter that has self-adjusting characteristics, such that the adaptive filter is capable of adjusting filter coefficient values automatically. For example, an adaptive filter may have a transfer function controlled by variable parameters and a means to adjust those parameters according to an optimization procedure or an optimization problem. This may involve the use of a cost function (e.g., loss function), which is a criterion for optimum performance of the adaptive filter, to feed an optimization procedure, which determines how to modify the filter transfer function in order to minimize the cost on the next iteration. In some examples, an optimization problem consists of maximizing or minimizing a real function by systematically choosing input values from within an allowed set and calculating the value of the function. For example, the adaptive filter may perform adaptation and iteratively update the adaptive filter coefficient values in order converge on an optimized solution.

To illustrate an example, a closed loop adaptive filter may use feedback in the form of an error signal to refine its transfer function. For example, the adaptive filter may receive first data as an input and may generate second data using the first data and the adaptive filter coefficient values. The error signal may be generated using the second data and fed back into the adaptive filter, enabling the adaptive filter to perform adaptation and update the adaptive filter coefficient values to maximize or minimize the error signal. For example, the adaptive filter may use the error signal to create updated weights (e.g., adaptive filter coefficients) for the filters, and these updated weights may be used to weight future signals. However, the disclosure is not limited thereto and the adaptive filter may vary without departing from the disclosure.

A speed at which the adaptive filter adapts one weight to an updated weight (e.g., rate of adaptation or adaptation rate) may be a function of a step-size or time constant associated with the adaptive filter. In some examples, the adaptive filter may vary the step-size or time constant in order to modulate the adaptation rate based on system conditions. For example, the adaptive filter may increase the adaptation rate to reduce an amount of time required for the adaptive filter to update the adaptive filter coefficient values, enabling the adaptive filter to converge more quickly. Additionally or alternatively, the adaptive filter may decrease the adaptation rate to increase an amount of time required for the adaptive filter to update the adaptive filter coefficient values, which may improve stability. In some examples, the adaptive filter may cease to update the adaptive filter coefficient values for a duration of time, which may be referred to as freezing adaptation of the adaptive filter. For example, the adaptive filter may freeze adaptation in response to voice activity being detected, wind being detected, and/or the like without departing from the disclosure.

FIG. 8 illustrates examples of equations used to determine a gain weighting according to embodiments of the present disclosure. While performing some audio processing, it may be beneficial for the device 110 to convert the microphone audio signals from a time domain to a subband domain without departing from the disclosure. For example, the device 110 may convert an i-th microphone signal $x_i(n)$ in a time domain to an i-th microphone signal $X_i(n,k)$ in a subband domain, where n is the frame index and k is the frequency index (e.g., frequency bin or subband).

In some examples, the device 110 may convert from the time domain to the subband domain using a Goertzel filter. For example, a Goertzel filter may calculate the complex spectra of each signal, recursively smoothed over successive time frames. The Goertzel filter may be configured to estimate a single desired Discrete Fourier Transform (DFT) frequency bin (e.g., subband), and can be implemented as a first-stage recursive filter followed by a single feed-forward stage. While this is similar to performing a Short Term Fourier Transform (STFT), the Goertzel filter may be computationally efficient. However, the disclosure is not limited thereto and in other examples the device 110 may include an analysis filterbank without departing from the disclosure. For example, an analysis filterbank may include a uniform discrete Fourier transform (DFT) filterbank to convert the microphone signal from the time domain into the subband domain, which may include converting to the frequency domain and then separating different frequency ranges into a plurality of individual subbands.

After converting to the subband domain, the audio signal from the i-th microphone may be represented as $X_i(n, k)$, where i denotes the microphone, n denotes the frame index, and k denotes the sub-band index. Using an i-th microphone signal $X_i(n,k)$, in some examples the device 110 may generate a PSD estimate (e.g., PSD function) using the following equation:

$$S_{x_i}[n,k]=(1-\lambda)S_{x_i[n-}1,k]+\lambda\cdot|X_i[n,k]|^2 \quad [1]$$

where $S_{x_i}[n, k]$ is the PSD estimate, i is the microphone index, n is the frame index, k is the frequency index, and $\lambda\in(0, 1)$ denotes a forgetting factor (e.g., value between 0 and 1 that controls a rate of change). To determine an instantaneous PSD estimate, the device 110 may set the forgetting factor to a first value (e.g., 1), which results in $S_{x_i}[n, k]=|X_i[n, k]|^2$.

The device 110 may calculate a cross-PSD estimate (e.g., CPSD function) using the following equation:

$$S_{x_0x_1}[n,k]=(1-\lambda)S_{x_0x_1}[n-1,k]+\lambda\cdot X_0[n,k]X_1{}^*[n,k] \quad [2]$$

where ( )* is complex conjugate, $S_{x_i}[n, k]$ is the PSD estimate for the i-th microphone, i is the microphone index, n is the frame index, k is the frequency index, and $\lambda\in(0, 1)$ denotes the forgetting factor.

FIG. 8 illustrates examples of weighting equations 800, which may be used to determine the weighted gain values associated with the feed-forward microphones. The theoretical limit of ANC processing may be achieved by perfectly designing a filter that subtracts a primary path transfer function (e.g., $N_{OI}$) and inverts a secondary path transfer function (e.g., $H_{DI}$), as represented by ideal ANC filter 810:

$$ANC_{ideal}^{FF}(j\omega) = \frac{-N_{OI}(j\omega)}{H_{DI}(j\omega)} \quad [3]$$

The primary path transfer function $N_{OI}$ represents a transfer function from an outer microphone (e.g., feed-forward microphone) to an inner microphone (e.g., feedback microphone) in diffuse noise, while the secondary path transfer function $H_{DI}$ represents a transfer function from the driver to the inner microphone (e.g., feedback microphone). For ease of illustration, in some examples a position of the ear canal of the user 5 may be approximated by the location of the feedback microphone. For example, in order to distinguish the feedback microphone from multiple feed-forward microphones located outside the ear canal, some equations may reference the feedback microphone using a symbol (e.g., "e") associated with the ear without departing from the disclosure.

Assuming a perfect filter, the amount of cancellation will be a function of the magnitude squared coherence between the outer microphone (O) and the inner microphone (I) per frequency, which may be referred to as coherence limit 820:

$$\text{Coherence Limit}=10*\log_{10}(1-C_{OI}(jw)) \quad [4]$$

If the device 110 includes multiple feed-forward microphones, the device 110 may assess the coherence limit of each microphone individually. Using the solution to the generalized Rayleigh quotient, the device 110 may predict the coherence limit for combining multiple microphones together as follows. For each frequency, the device 110 may calculate a cross-power spectral density matrix 830 for the inner ear microphone (e) and the feed-forward microphones, where the feed-forward microphones are labeled $[m_1, m_2, \ldots m_N]$. While the following example only illustrates two feed-forward microphones, the disclosure is not limited thereto:

$$CPSD(j\omega) = \begin{bmatrix} S_{ee} & S_{m_1e} & S_{m_3e} \\ S_{em_1} & S_{m_1m_1} & S_{m_2m_1} \\ S_{em_2} & S_{m_1m_2} & S_{m_2m_2} \end{bmatrix} \quad [5]$$

To maximize FF ANC performance, the device 110 may find the optimal weighting (w) of the feed-forward microphones to maximize the magnitude squared coherence between the ear (E) and the sum of microphones (Y). For example, the device 110 may use weighting 840 to solve optimization 850:

$$Y = [w_1 * m_1 + w_2 * m_2 + \ldots\ w_n * m_2] \quad [6]$$

$$\text{maximize } C_{ey} = \text{maximize } \frac{|S_{ey}|^2}{S_{ee}S_{yy}} = \text{maximize } \frac{|S_{ey}|}{S_{yy}}$$

The solution to the optimal weights can be solved in the form of a generalized Rayleigh quotient, where the solution is the Eigenvector associated with the maximum eigenvalue. FIG. 8 illustrates this as optimization 860:

$$\text{maximize } \frac{w^H A w}{w^H B w} \quad [7]$$

$$A = aa^H = [S_{m_1e} S_{m_2e}] * [S_{m_1e} S_{m_2e}]^H$$

$$B = \begin{bmatrix} S_{m_1m_1} & S_{m_2m_1} \\ S_{m_1m_2} & S_{m_2m_2} \end{bmatrix}$$

After using the weighting to combine the feed-forward microphone signals to a single channel, the device 110 may calculate the theoretical best FF ANC by determining a combined coherence limit 870:

$$\text{Coherence Limit}=10*\log_{10}(1-C_{ey}(jw)) \quad [8]$$

Figure 9:
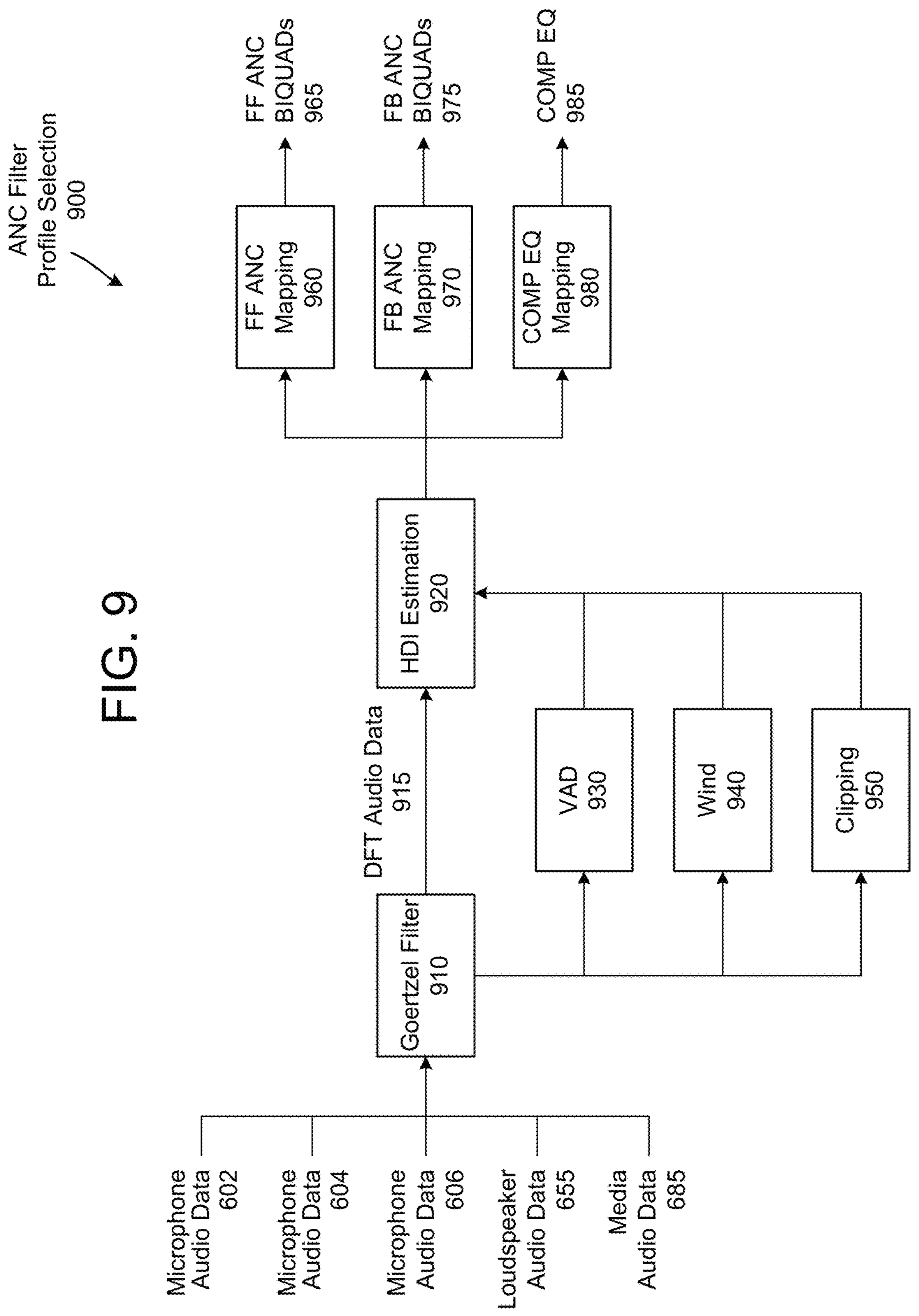
FIG. 9 illustrates an example of determining active noise cancellation filter profiles according to embodiments of the present disclosure.

FIG. 9 illustrates an example of determining active noise cancellation filter profiles according to embodiments of the present disclosure. As illustrated in FIG. 9, a Goertzel filter component 910 may receive the microphone audio data 602, the microphone audio data 604, the microphone audio data 606, the loudspeaker audio data 655, and/or the media audio data 685 described above and may generate DFT audio data 915. For example, the Goertzel filter may convert these signals from the time domain to the subband domain and generate complex spectra, as described above.

Using the DFT audio data 915 generated by the Goertzel filter, an $H_{DI}$ estimation component 920 may estimate the secondary path transfer function $H_{DI}$ (e.g., transfer function from the driver to the inner microphone). As described below with regard to FIGS. 10-11, the device 110 can map a magnitude of the transfer function $H_{DI}$ at discrete frequencies to optimum feed-forward and feedback filter gains or BIQUADs. For example, the magnitude of the transfer function and the magnitude of the optimum feedforward and/or feedback filter gains may be linearly related, although the disclosure is not limited thereto.

In some examples, the system 100 may pre-compute optimum ANC filters via data collection measurements and the device 110 may store these optimum ANC filters as a plurality of ANC filter profiles. The number of frequency points $f_n$ is tunable, with a tradeoff between complexity and performance.

$$\text{Biquad Parametric Gains} = b_0 + \sum_{n=1}^{K} b_n * |H_{di}(f_n)| \quad [9]$$

As illustrated in FIG. 9, the device 110 may perform ANC filter profile selection 900 by using the estimated transfer function $H_{DI}$ to select a particular ANC filter profile (e.g., feed-forward and feedback filter gains or BIQUADs) from a plurality of ANC filter profiles. For example, the device 110 may determine a magnitude of the estimated transfer function $H_{DI}$ at discrete frequencies, which indicates an ear response of the user 5, and may select a corresponding ANC filter profile. Thus, a feed-forward (FF) ANC mapping component 960 may use the estimated transfer function $H_{DI}$ to output FF ANC BIQUADs 965, a feedback (FB) ANC mapping component 970 may use the estimated transfer function $H_{DI}$ to output FB ANC BIQUADs 975, and a compensation equalization (COMP EQ) mapping component 980 may use the estimated transfer function $H_{DI}$ to output COMP EQ data 985.

In some examples, the device 110 may perform additional steps to ensure that the estimated secondary path transfer function $H_{DI}$ is reliable. For example, the device 110 may determine a magnitude-squared coherence, which measures how similar two signals are and is used as a reliability metric for trusting the estimated transfer function $H_{DI}$. In addition, the device 110 may include a voice activity detection (VAD) component 930, a wind detection component 940, and a clipping detection component 950. If the device 110 detects voice activity by the user 5, wind activity, and/or clipping (e.g., discrete sound events that exceed a desired range), the $H_{DI}$ estimation component 920 may slow adaptation, freeze adaptation, and/or ignore the estimated transfer function $H_{DI}$, although the disclosure is not limited thereto.

Figure 10:
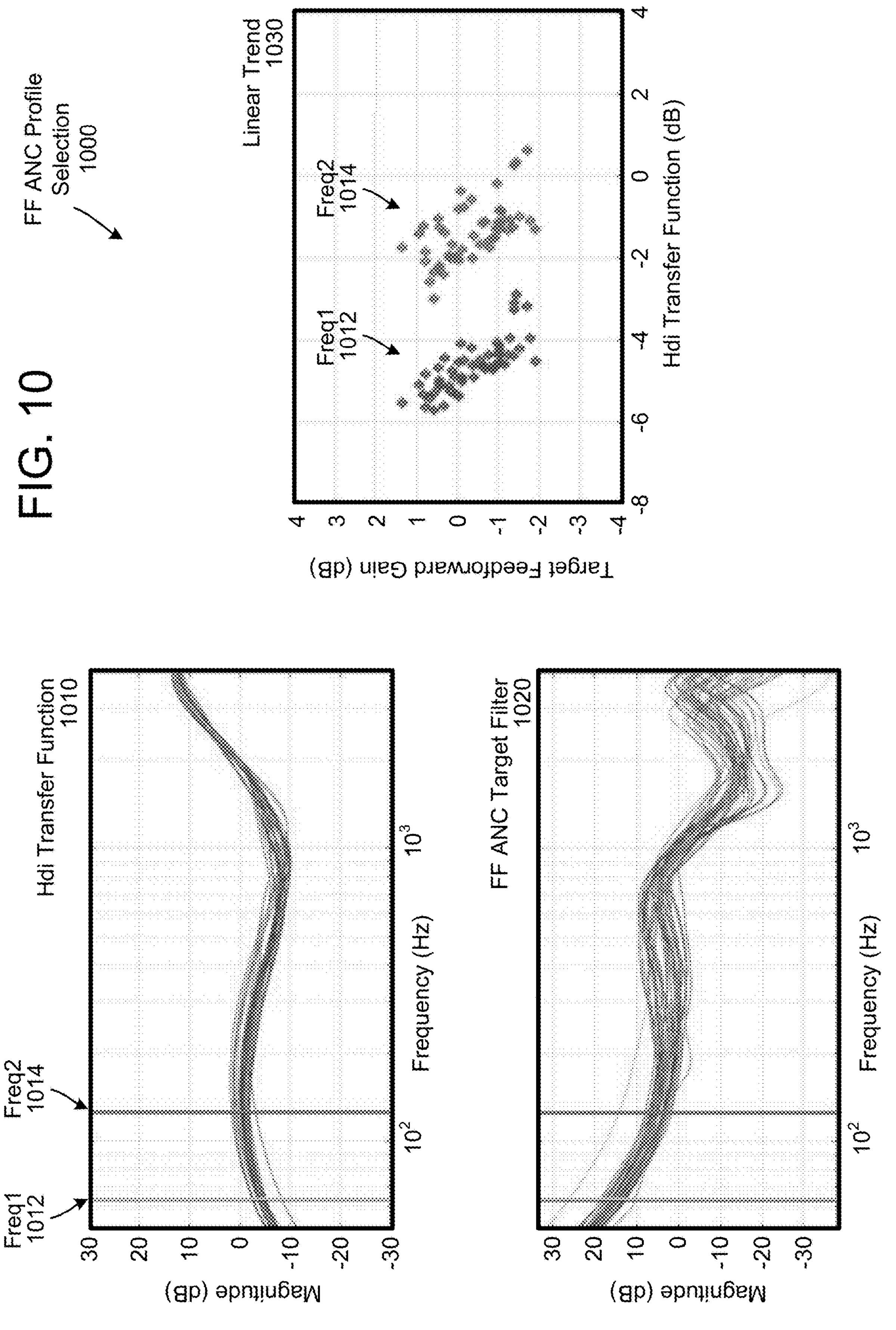
FIG. 10 illustrates an example of performing transfer function estimation by monitoring a secondary path according to embodiments of the present disclosure.

FIG. 10 illustrates an example of performing transfer function estimation by monitoring a secondary path according to embodiments of the present disclosure. In some examples, the device 110 may perform FF ANC profile selection 1000 based on the estimated transfer function $H_{DI}$, as described above. For example, FIG. 10 illustrates a plurality of measured Hdi transfer functions 1010, a plurality of FF ANC target filters 1020 (e.g., FF ANC profiles), and a linear trend 1030 illustrating the correlation. As illustrated in FIG. 10, the device 110 may determine a magnitude of the estimated transfer function $H_{DI}$ at two discrete frequencies (e.g., Freq1 1012 and Freq2 1014) to select one of the plurality of FF ANC profiles that is tailored to the user 5.

Figure 11:
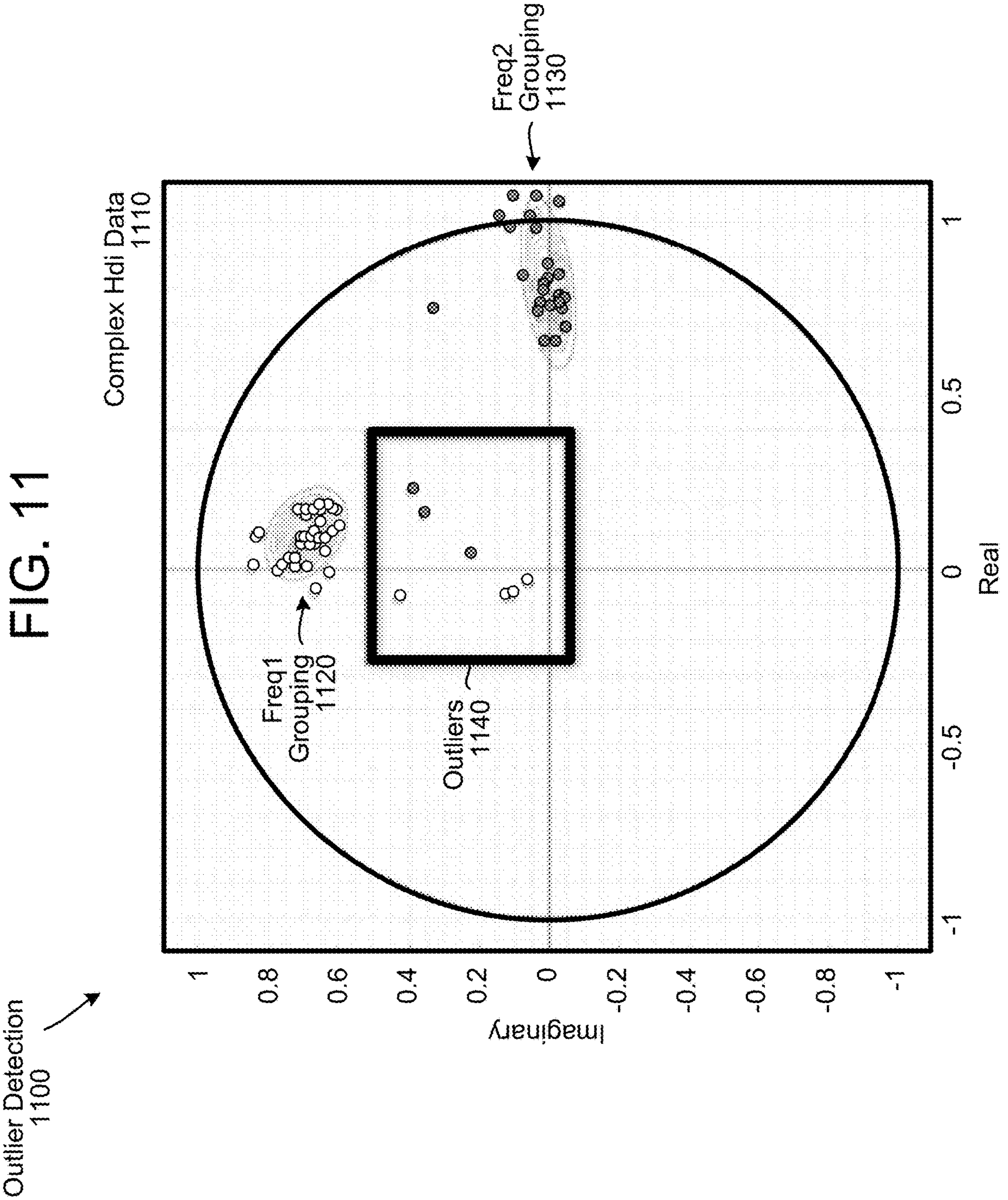
FIG. 11 illustrates an example of performing outlier detection during transfer function estimation according to embodiments of the present disclosure.

FIG. 11 illustrates an example of performing outlier detection during transfer function estimation according to embodiments of the present disclosure. As illustrated in FIG. 11, in some examples the HDI estimation component 920 may perform outlier detection 1100 to ensure that the estimated transfer function $H_{DI}$ is within the expected distribution. For example, complex $H_{di}$ data 1110 exhibits a first grouping (e.g., Freq1 grouping 1120) associated with the first frequency and a second grouping (e.g., Freq2 grouping 1130) associated with the second frequency. Thus, the device 110 may ignore the estimated transfer function $H_{DI}$ when outliers 1140 are detected.

Figure 12:
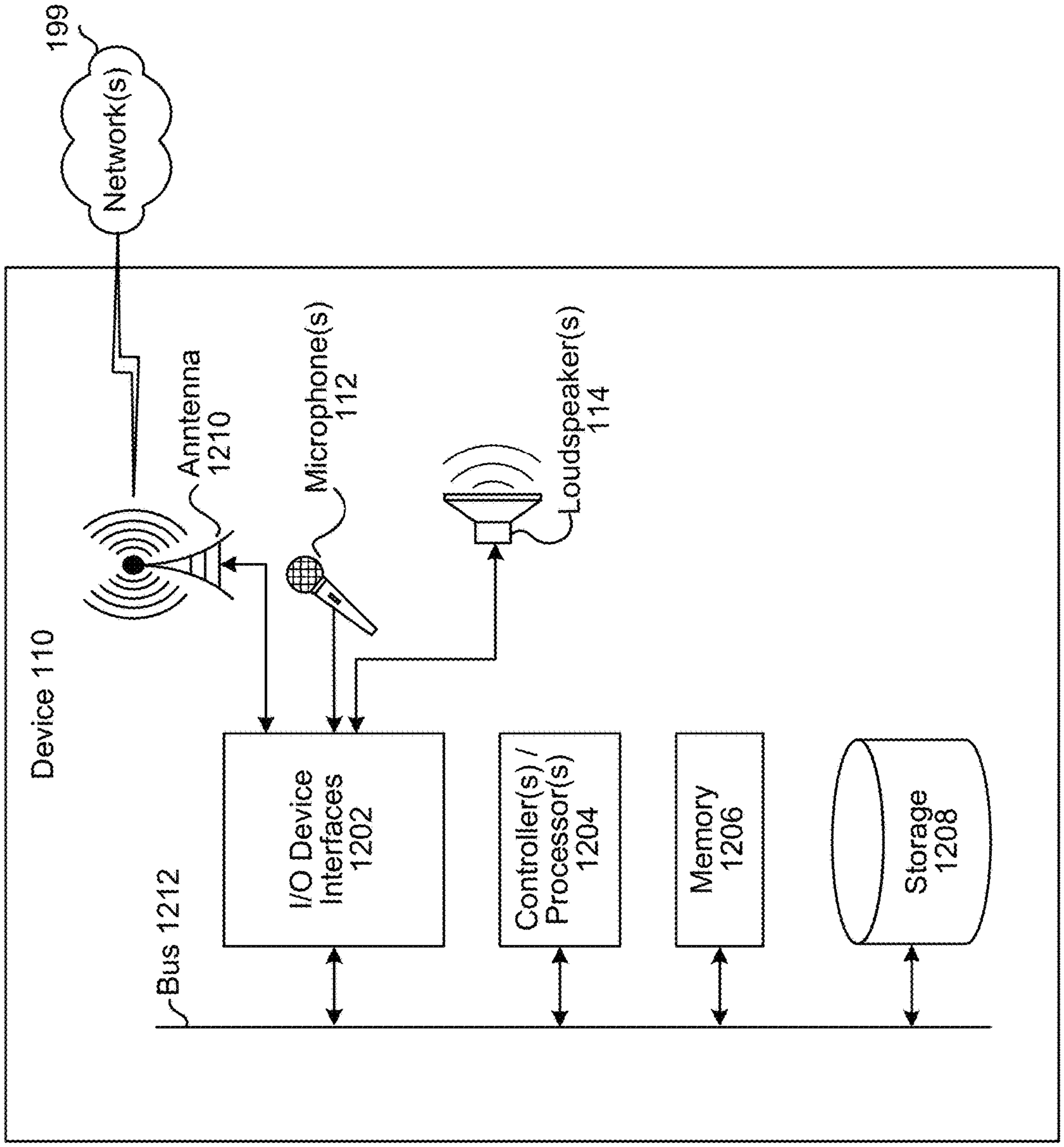
FIG. 12 is a block diagram conceptually illustrating example components of a system for beamforming according to embodiments of the present disclosure.

FIG. 12 is a block diagram conceptually illustrating example components of the system 100. In operation, the system 100 may include computer-readable and computer-executable instructions that reside on the system, as will be discussed further below. The system 100 may include one or more audio capture device(s), such as microphones 112. The audio capture device(s) may be integrated into a single device or may be separate. The system 100 may also include an audio output device for producing sound, such as loudspeaker(s) 114. The audio output device may be integrated into a single device or may be separate. The system 100 may include an address/data bus 1212 for conveying data among components of the system 100. Each component within the system may also be directly connected to other components in addition to (or instead of) being connected to other components across the bus 1212.

The system 100 may include one or more controllers/processors 1204 that may each include a central processing unit (CPU) for processing data and computer-readable instructions, and a memory 1206 for storing data and instructions. The memory 1206 may include volatile random-access memory (RAM), non-volatile read only memory (ROM), non-volatile magnetoresistive (MRAM) and/or other types of memory. The system 100 may also include a data storage component 1208, for storing data and controller/processor-executable instructions (e.g., instructions to perform operations discussed herein). The data storage component 1208 may include one or more non-volatile storage types such as magnetic storage, optical storage, solid-state storage, etc. The system 100 may also be connected to removable or external non-volatile memory and/or storage (such as a removable memory card, memory key drive, networked storage, etc.) through the input/output device interfaces 1202.

Computer instructions for operating the system 100 and its various components may be executed by the controller(s)/processor(s) 1204, using the memory 1206 as temporary "working" storage at runtime. The computer instructions may be stored in a non-transitory manner in non-volatile memory 1206, storage 1208, and/or an external device. Alternatively, some or all of the executable instructions may be embedded in hardware or firmware in addition to or instead of software.

The system may include input/output device interfaces 1202. A variety of components may be connected through the input/output device interfaces 1202, such as the loudspeaker(s) 114, the microphone(s) 112, and a media source such as a digital media player (not illustrated). The input/output interfaces 1202 may include A/D converters (not shown) and/or D/A converters (not shown).

The input/output device interfaces 1202 may also include an interface for an external peripheral device connection such as universal serial bus (USB), FireWire, Thunderbolt or other connection protocol. The input/output device interfaces 1202 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network(s) 199, the system 100 may be distributed across a networked environment.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

generating, using a first microphone of an in-ear device, first microphone audio data, the first microphone being external to an ear canal of a user;

generating, using a second microphone of the in-ear device, second microphone audio data, the second microphone being external to the ear canal of the user;

generating, using a third microphone of the in-ear device, third microphone audio data, the third microphone being located in the ear canal of the user;

determining first data representing first coherence values using the first microphone audio data, the second microphone audio data, and the third microphone audio data;

determining, using the first data, first weight values associated with the first microphone and second weight values associated with the second microphone;

determining first audio data using the first microphone audio data, the first weight values, the second microphone audio data, and the second weight values;

generating, by an active noise cancellation component using the first audio data and fixed filter coefficient values, second audio data, wherein the fixed filter coefficient values correspond to a geometry of the in-ear device; and generating, by a loudspeaker of the in-ear device, output audio using the second audio data.

2. The computer-implemented method of claim 1, wherein generating the second audio data further comprises:

determining, using an adaptive filter, an estimated transfer function between the loudspeaker and the third microphone;

determining a first magnitude value of the estimated transfer function for a first frequency band;

determining a second magnitude value of the estimated transfer function for a second frequency band;

determining, using the first magnitude value and the second magnitude value, a plurality of filter coefficient values; and generating, by the active noise cancellation component, using the first audio data and the plurality of filter coefficient values, the second audio data.

3. The computer-implemented method of claim 2, further comprising:

determining that voice activity is detected in a first portion of the third microphone audio data, the first portion of the third microphone audio data corresponding to a first time duration;

determining that wind activity is detected in a first portion of the first microphone audio data, the first portion of the first microphone audio data corresponding to a second time duration; and ceasing adaptation of the adaptive filter during the first time duration and the second time duration.

4. The computer-implemented method of claim 1, wherein generating the second audio data further comprises:

determining first filter coefficient values of an adaptive filter associated with the active noise cancellation component using the third microphone audio data; and generating, by the active noise cancellation component, the second audio data using the first audio data, the first filter coefficient values, and the adaptive filter.

5. The computer-implemented method of claim 1, further comprising:

determining second data representing second coherence values using the first microphone audio data, the second microphone audio data, and the third microphone audio data;

determining, using the second data, third weight values associated with the first microphone and fourth weight values associated with the second microphone;

determining third audio data using the first microphone audio data, the third weight values, the second microphone audio data, and the fourth weight values; and generating, using the third audio data and the active noise cancellation component, fourth audio data.

6. The computer-implemented method of claim 1, wherein the first weight values and the second weight values are determined by maximizing a magnitude squared coherence between the third microphone audio data and third audio data, the third audio data generated using the first microphone audio data, the second microphone audio data, the first weight values, and the second weight values.

7. The computer-implemented method of claim 1, wherein determining the first data further comprises:

determining a first power spectral density (PSD) function associated with the first microphone audio data;

determining a second PSD function associated with the second microphone audio data;

determining a first cross-PSD function using the first PSD function and the second PSD function; and determining the first data, wherein the first data includes the first cross-PSD function.

8. The computer-implemented method of claim 1, further comprising:

generating, using the third microphone audio data and a feedback active noise cancellation component, third audio data; and generating fourth audio data using the second audio data and the third audio data, wherein the loudspeaker generates the output audio using the fourth audio data.

9. The computer-implemented method of claim 1, further comprising:

receiving third audio data representing media content;

generating, using the third microphone audio data and a feedback active noise cancellation component, fourth audio data; and generating fifth audio data using the second audio data, the third audio data, and the fourth audio data, wherein the loudspeaker generates the output audio using the fifth audio data.

10. A system comprising:

at least one processor; and memory including instructions operable to be executed by the at least one processor to cause the system to:

generate, using a first microphone of an in-ear device, first microphone audio data, the first microphone being external to an ear canal of a user;

generate, using a second microphone of the in-ear device, second microphone audio data, the second microphone being external to the ear canal of the user;

generate, using a third microphone of the in-ear device, third microphone audio data, the third microphone being located in the ear canal of the user;

determine first data representing first coherence values using the first microphone audio data, the second microphone audio data, and the third microphone audio data;

determine, using the first data, first weight values associated with the first microphone and second weight values associated with the second microphone;

determine first audio data using the first microphone audio data, the first weight values, the second microphone audio data, and the second weight values;

generate, by an active noise cancellation component using the first audio data and fixed filter coefficient values, second audio data, wherein the fixed filter coefficient values correspond to a geometry of the in-ear device; and generate, by a loudspeaker of the in-ear device, output audio using the second audio data.

11. The system of claim 10, wherein the memory further comprises instructions that, when executed by the at least one processor, further cause the system to:

determine, using an adaptive filter, an estimated transfer function between the loudspeaker and the third microphone;

determine a first magnitude value of the estimated transfer function for a first frequency band;

determine a second magnitude value of the estimated transfer function for a second frequency band;

determine, using the first magnitude value and the second magnitude value, a plurality of filter coefficient values; and generate, by the active noise cancellation component, using the first audio data and the plurality of filter coefficient values, the second audio data.

12. The system of claim 11, wherein the memory further comprises instructions that, when executed by the at least one processor, further cause the system to:

determine that voice activity is detected in a portion of the third microphone audio data, the portion of the third microphone audio data corresponding to a first time duration;

determine that wind activity is detected in a portion of the first microphone audio data, the portion of the first microphone audio data corresponding to a second time duration; and cease adaptation of the adaptive filter during the first time duration and the second time duration.

13. The system of claim 10, wherein the memory further comprises instructions that, when executed by the at least one processor, further cause the system to:

determine first filter coefficient values of an adaptive filter associated with the active noise cancellation component using the third microphone audio data; and generate, by the active noise cancellation component, the second audio data using the first audio data, the first filter coefficient values, and the adaptive filter.

14. The system of claim 10, wherein the memory further comprises instructions that, when executed by the at least one processor, further cause the system to:

determine second data representing second coherence values using the first microphone audio data, the second microphone audio data, and the third microphone audio data;

determine, using the second data, third weight values associated with the first microphone and fourth weight values associated with the second microphone;

determine third audio data using the first microphone audio data, the third weight values, the second microphone audio data, and the fourth weight values; and generate, using the third audio data and the active noise cancellation component, fourth audio data.

15. The system of claim 10, wherein the first weight values and the second weight values are determined by maximizing a magnitude squared coherence between the third microphone audio data and third audio data, the third audio data generated using the first microphone audio data, the second microphone audio data, the first weight values, and the second weight values.

16. The system of claim 10, wherein the memory further comprises instructions that, when executed by the at least one processor, further cause the system to:

determine a first power spectral density (PSD) function associated with the first microphone audio data;

determine a second PSD function associated with the second microphone audio data;

determine a first cross-PSD function using the first PSD function and the second PSD function; and determine the first data, wherein the first data includes the first cross-PSD function.

17. The system of claim 10, wherein the memory further comprises instructions that, when executed by the at least one processor, further cause the system to:

generate, using the third microphone audio data and a feedback active noise cancellation component, third audio data; and generate fourth audio data using the second audio data and the third audio data, wherein the loudspeaker generates the output audio using the fourth audio data.

18. The system of claim 10, wherein the memory further comprises instructions that, when executed by the at least one processor, further cause the system to:

receive third audio data representing media content;

generate, using the third microphone audio data and a feedback active noise cancellation component, fourth audio data; and generate fifth audio data using the second audio data, the third audio data, and the fourth audio data, wherein the loudspeaker generates the output audio using the fifth audio data.

* * * * *